United States Patent
Lee et al.

(10) Patent No.: US 11,818,748 B2
(45) Date of Patent: Nov. 14, 2023

(54) METHOD AND DEVICE FOR PERFORMING BWP SWITCHING IN WIRELESS COMMUNICATION SYSTEM

(71) Applicant: LG ELECTRONICS INC., Seoul (KR)

(72) Inventors: Jongyoul Lee, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 194 days.

(21) Appl. No.: 17/416,909

(22) PCT Filed: Dec. 17, 2019

(86) PCT No.: PCT/KR2019/017916
§ 371 (c)(1),
(2) Date: Jun. 21, 2021

(87) PCT Pub. No.: WO2020/130593
PCT Pub. Date: Jun. 25, 2020

(65) Prior Publication Data
US 2022/0070878 A1    Mar. 3, 2022

(30) Foreign Application Priority Data
Dec. 18, 2018 (KR) .................. 10-2018-0164538

(51) Int. Cl.
*H04W 72/04* (2023.01)
*H04L 5/00* (2006.01)
(Continued)

(52) U.S. Cl.
CPC ............. *H04W 72/56* (2023.01); *H04W 4/40* (2018.02); *H04W 28/26* (2013.01); *H04W 72/044* (2013.01)

(58) Field of Classification Search
CPC ....... H04W 72/21; H04W 4/02; H04W 76/38; H04L 1/1848; H04L 69/28; H04L 5/0082;
(Continued)

(56) References Cited

U.S. PATENT DOCUMENTS

2018/0183551 A1  6/2018 Chou et al.
2019/0141546 A1*  5/2019 Zhou ................... H04B 7/0626
(Continued)

FOREIGN PATENT DOCUMENTS

WO    2018-194352 A1    10/2018

OTHER PUBLICATIONS

Oppo et al., "The Impacts of BWP Switch Delay" R2-1816252, 3GPP TSG-RAN WG2 Meeting #104, Nov. 2, 2018 (section 2.1).
(Continued)

*Primary Examiner* — Wutchung Chu
*Assistant Examiner* — Jason A Harley
(74) *Attorney, Agent, or Firm* — BRYAN CAVE LEIGHTON PAISNER LLP

(57) ABSTRACT

Provided herein are a method for performing wireless communication on a bandwidth part (BWP) by a first apparatus and an apparatus for supporting the same. The method may include the steps of performing communication on a first BWP, changing the first BWP to a second BWP based on a time period related to the BWP, and performing communication on the second BWP.

10 Claims, 31 Drawing Sheets

(51) Int. Cl.
*H04W 28/26* (2009.01)
*H04W 36/06* (2009.01)
*H04W 24/02* (2009.01)
*H04L 47/74* (2022.01)
*H04B 7/06* (2006.01)
*H04B 7/08* (2006.01)
*H04W 72/02* (2009.01)
*H04W 72/56* (2023.01)
*H04W 4/40* (2018.01)
*H04W 72/044* (2023.01)

(58) Field of Classification Search
CPC ........... H04L 27/26025; H04L 27/0006; H04L 5/0098
USPC ......................................................... 370/330
See application file for complete search history.

(56) References Cited

U.S. PATENT DOCUMENTS

2019/0261406 A1\* 8/2019 Kim ...................... H04W 76/27
2020/0037260 A1\* 1/2020 Fu ........................ H04W 52/146
2022/0007364 A1\* 1/2022 Hou ...................... H04L 5/0098

OTHER PUBLICATIONS

Huawei et al., "On Relationship Between SL BWP and Uu BWP" R1-1814304, 3GPP TSG-RAN WG1 Meeting #95, Nov. 19, 2018 (section 2).
Intel Corporation, "Sidelink Physical Layer4 Structure and Procedures for NR V2X Communication" R1-1812488, 3GPP TSG-RAN WG1 Meeting #95, Nov. 3, 2018 (section 6).

\* cited by examiner

FIG. 9
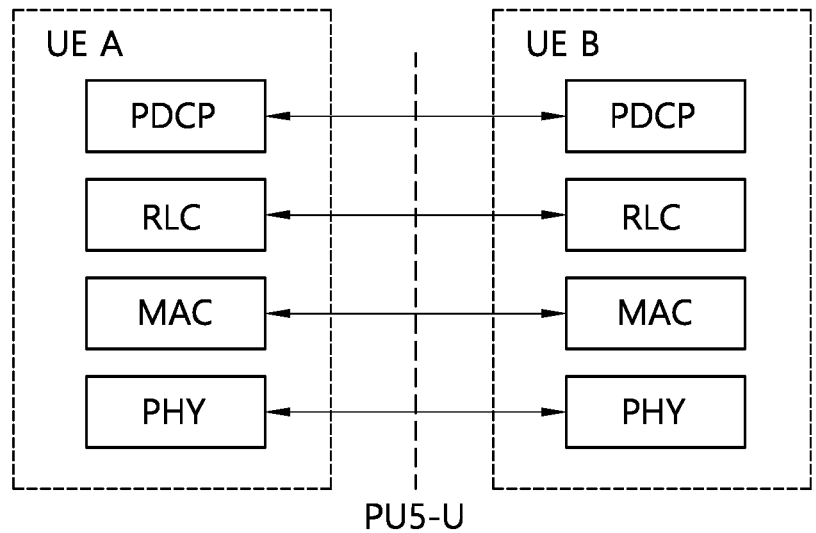
(a)
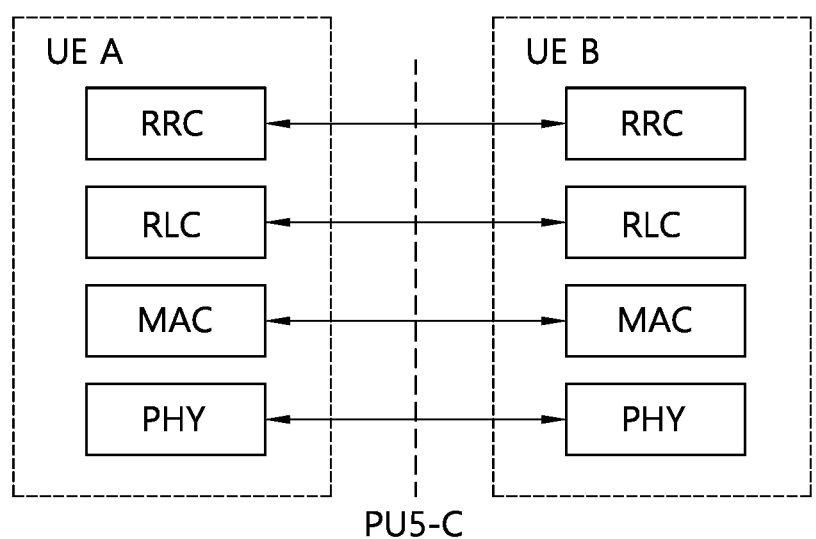
(b)

FIG. 10
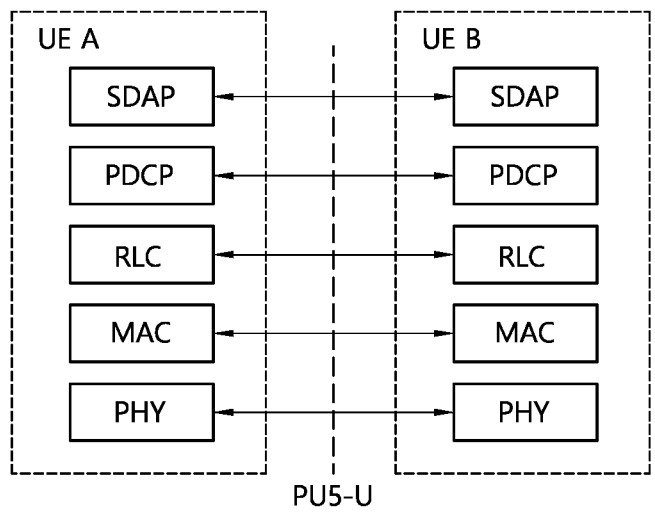
(a)
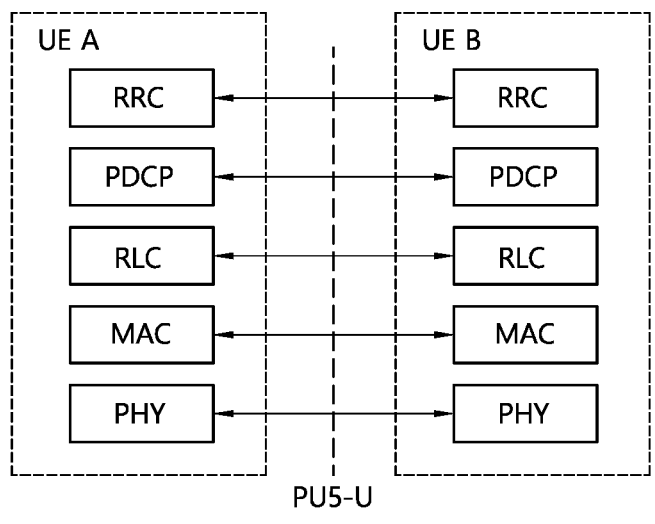
(b)

METHOD AND DEVICE FOR PERFORMING BWP SWITCHING IN WIRELESS COMMUNICATION SYSTEM

This application is the National Stage filing under 35 U.S.C. 371 of International Application No. PCT/KR2019/017916 filed on Dec. 17, 2019, which claims priority to Korean Patent Application No. 10-2018-0164538 filed on Dec. 18, 2018, the contents of which are hereby incorporated by reference herein in their entirety.

BACKGROUND OF THE DISCLOSURE

Field of the Disclosure

This disclosure relates to a wireless communication system.

Related Art

A wireless communication system is a multiple access system that supports communication of multiple users by sharing available system resources (e.g., a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on, via wired/wireless communication. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, In the NR Uu system, the UE may configure a Bandwidth Part (BWP) (e.g., Uu BWP) in each carrier for transmission/reception for uplink (UL)/downlink (DL) in a cell. For example, when the UE performs BWP switching between UL and DL, the UE may not perform transmission/reception operation during the BWP switching time period. For example, when the UE receives a command for switching the UL BWP from the base station after DL reception, the UE may not perform DL reception while switching to the UL BWP.

In the NR V2X sidelink system, the UE may configure sidelink (SL) BWP for performing sidelink communication. For example, Uu BWP and SL BWP may be independent. For example, when the UE performs a switching operation between the configured Uu BWP and the configured SL BWP, a problem may occur in an interruption period for the switching operation. For example, when SL transmission is required for the UE after the UE configures the Uu BWP to communicate with the base station, the UE may perform a BWP switching operation for re-configure the SL BWP. In this case, the UE may require a BWP switching time to perform a BWP switching operation. During the BWP switching time period, an interruption period in which the UE cannot perform the Uu transmit/receive operation and/or the SL transmit/receive operation may occur, and the UE may need to process the interruption period.

Technical Solutions

According to an embodiment, provided herein is a method for performing wireless communication by a first apparatus. The method may include the steps of performing communication on the first bandwidth part (BWP), and changing the first BWP to a second BWP based on a time period related to BWP, and performing communication on the second BWP.

Effects of the Disclosure

A user equipment (UE) may efficiently perform SL communication.

BRIEF DESCRIPTION OF THE DRAWINGS

FIG. 9 shows a radio protocol architecture for a SL communication, in accordance with an embodiment of the present disclosure.

FIG. 10 shows a radio protocol architecture for a SL communication, in accordance with an embodiment of the present disclosure.

FIG. 28 shows a vehicle, in accordance with an embodiment of the present disclosure. The vehicle may be implemented as a transport means, an aerial vehicle, a ship, and so on.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least any one of A, B and/or C". Furthermore, "A, B, C" may also mean "at least any one of A, B and/or C".

In various embodiments of the present disclosure, it shall be interpreted that "or" indicates "and/or". For example, "A or B" may include "only A", "only B", and/or "both A and B". In other words, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 1:
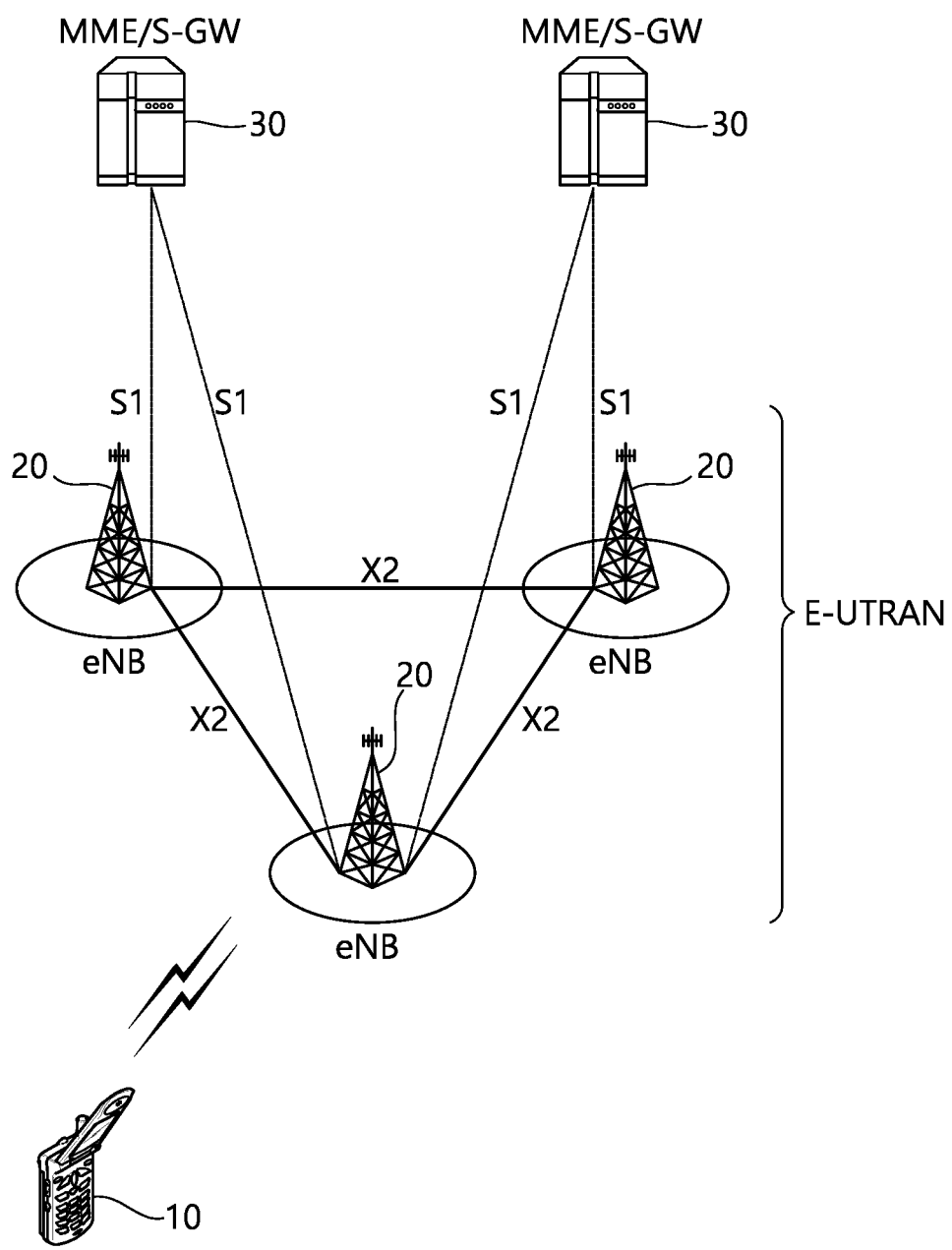
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
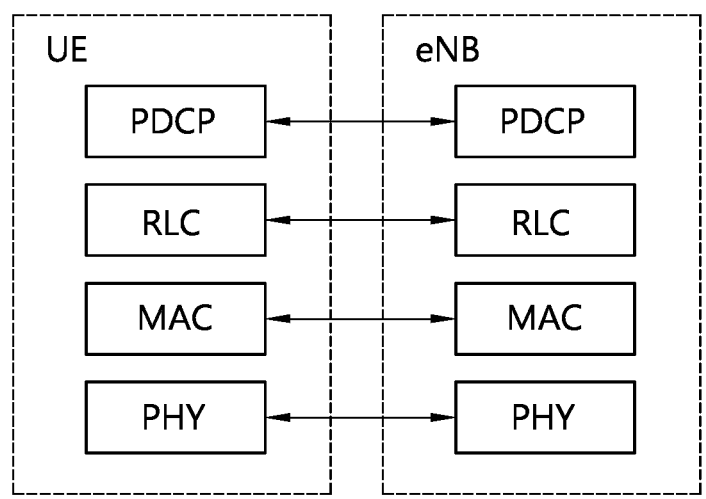
FIG. 2 shows a radio protocol architecture of a user plane, in accordance with an embodiment of the present disclosure.
Figure 3:
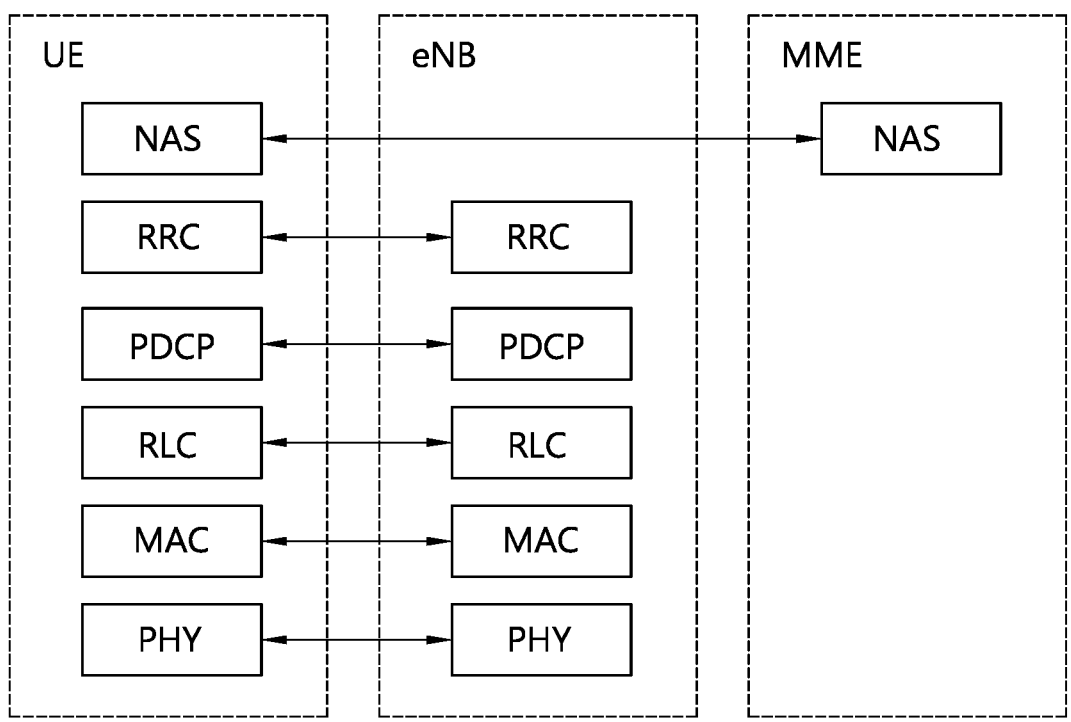
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
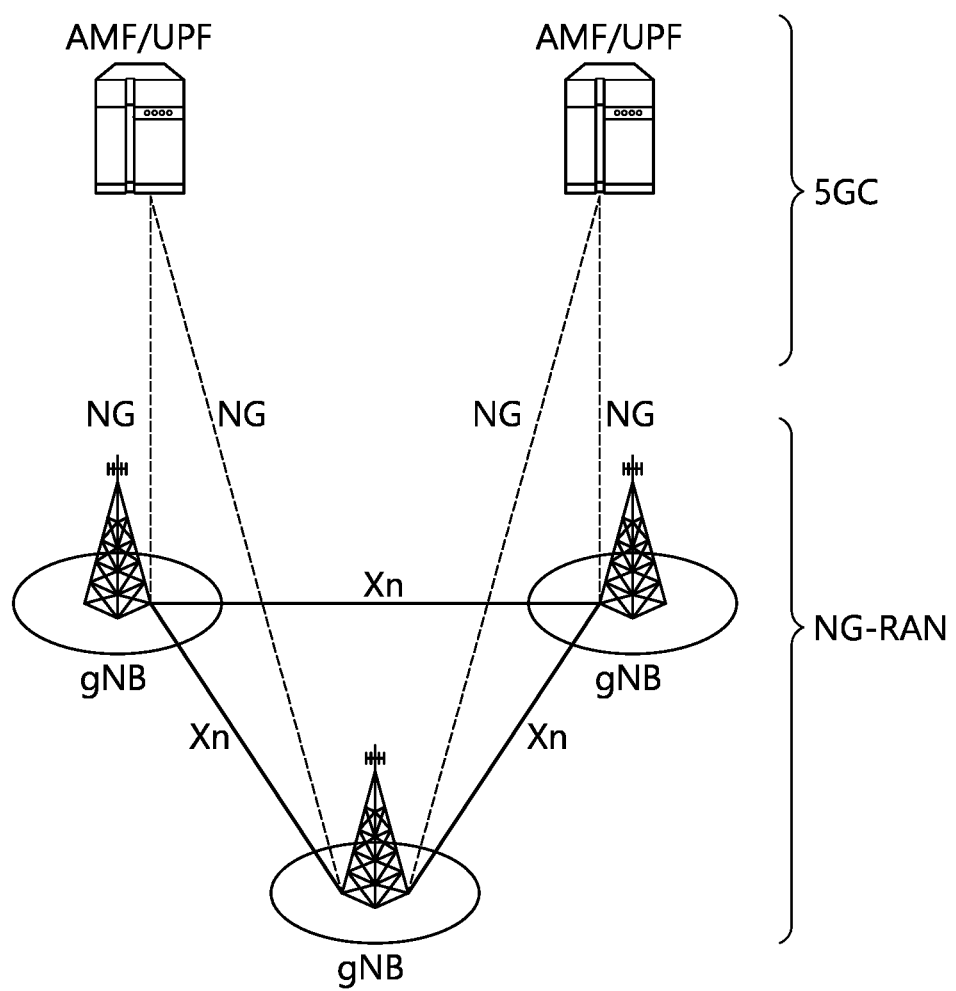
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
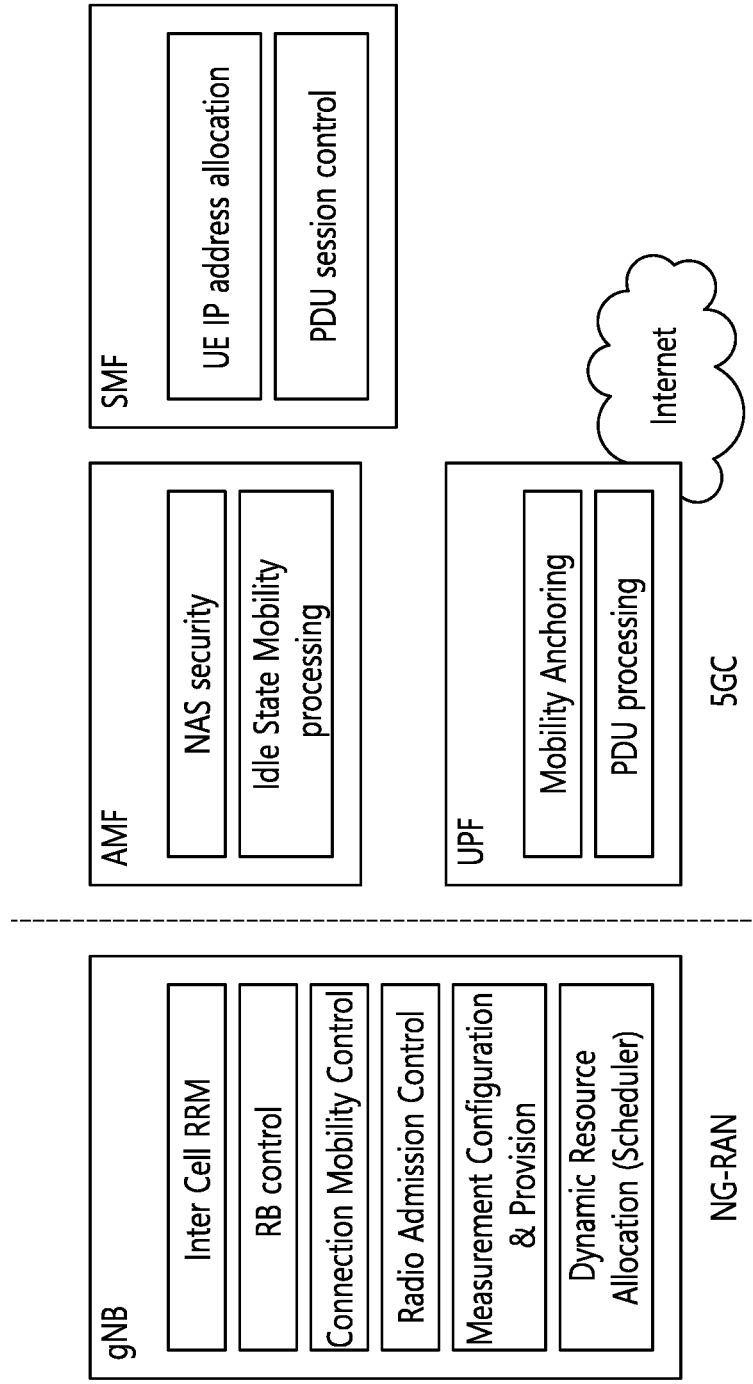
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
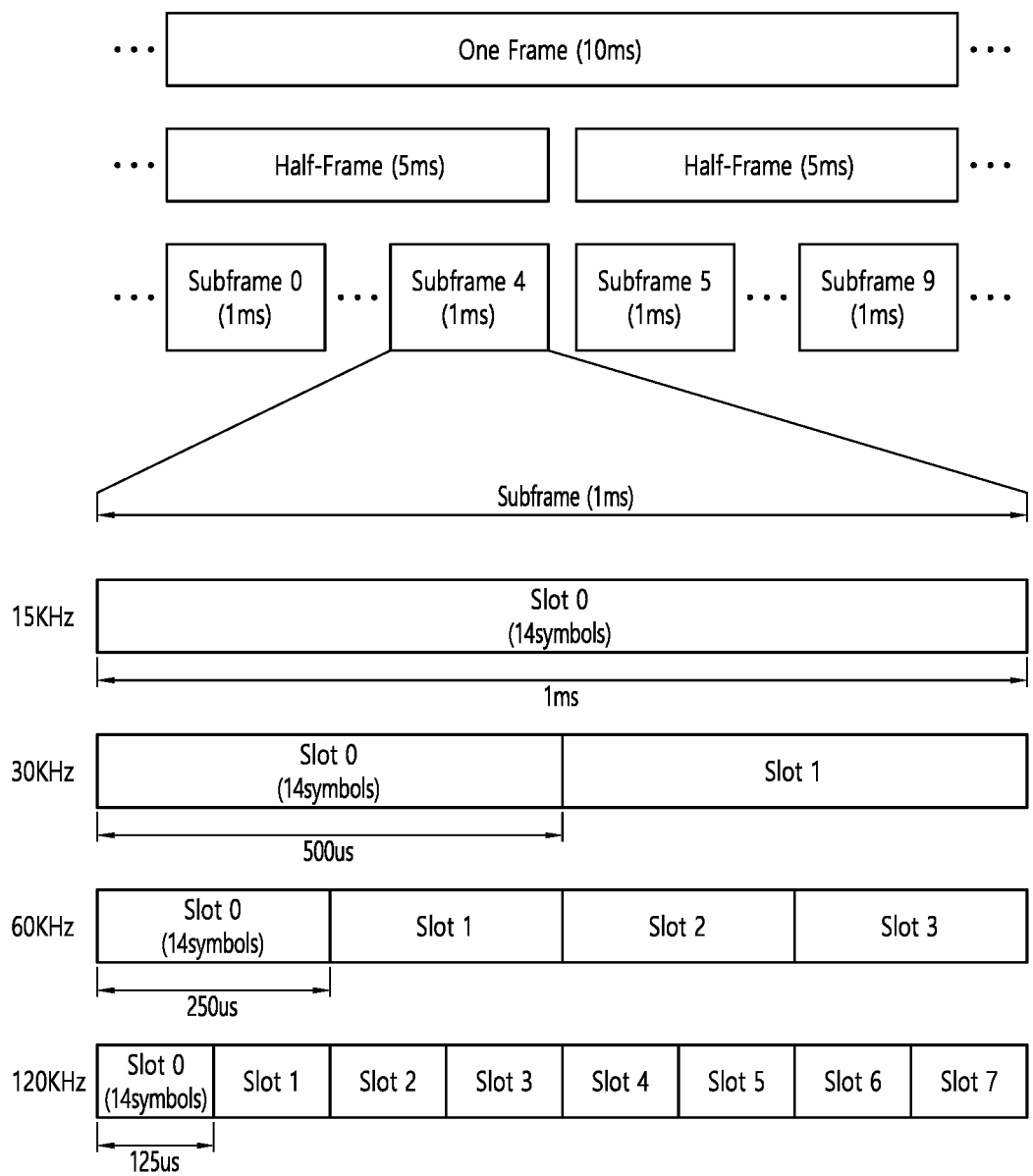
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table A1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS ($15 * 2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
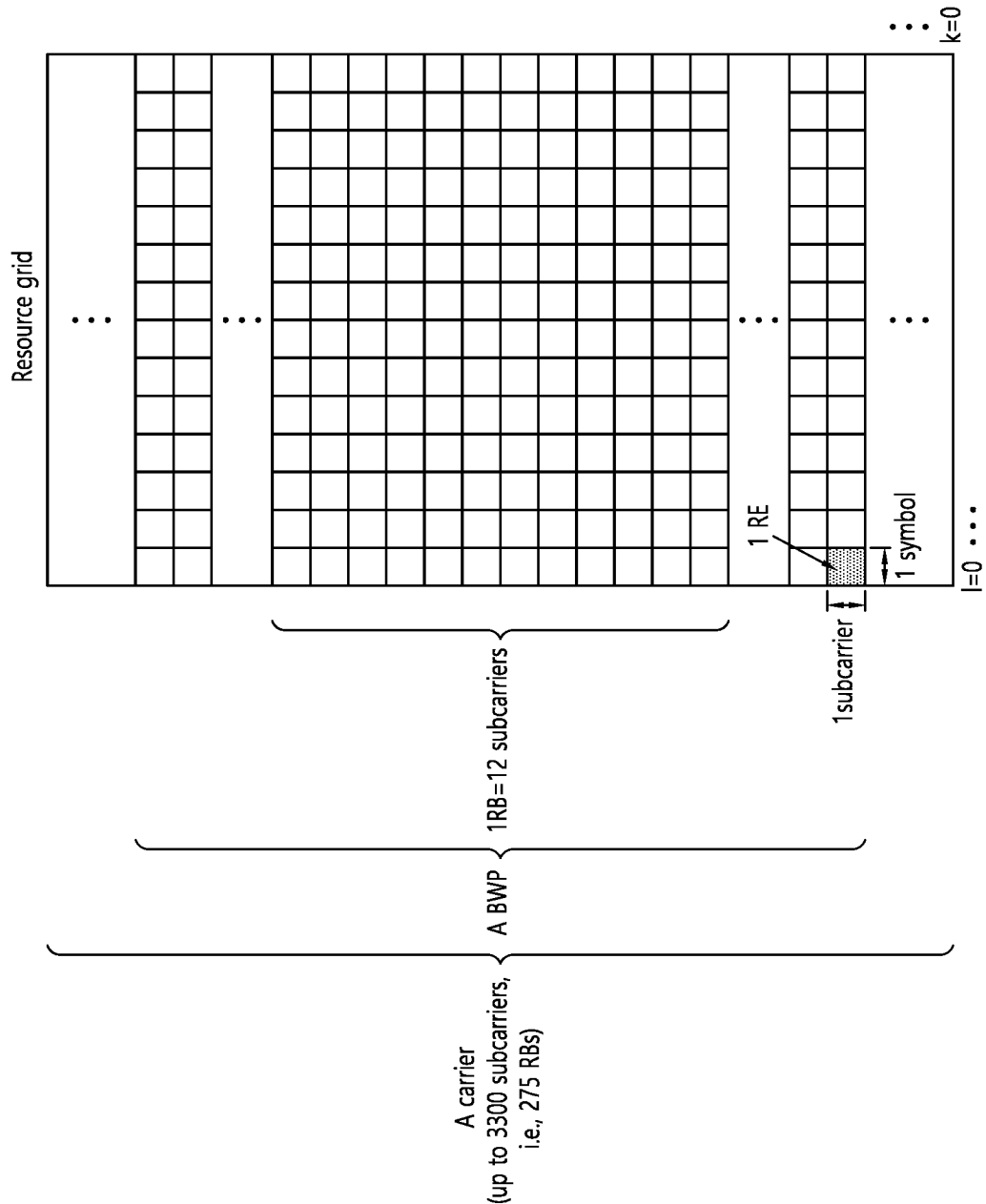
FIG. 7 shows a structure of a slot of an NR frame, in accordance with an embodiment of the present disclosure.

FIG. 7 shows a structure of a slot of an NR frame, in accordance with an embodiment of the present disclosure. Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
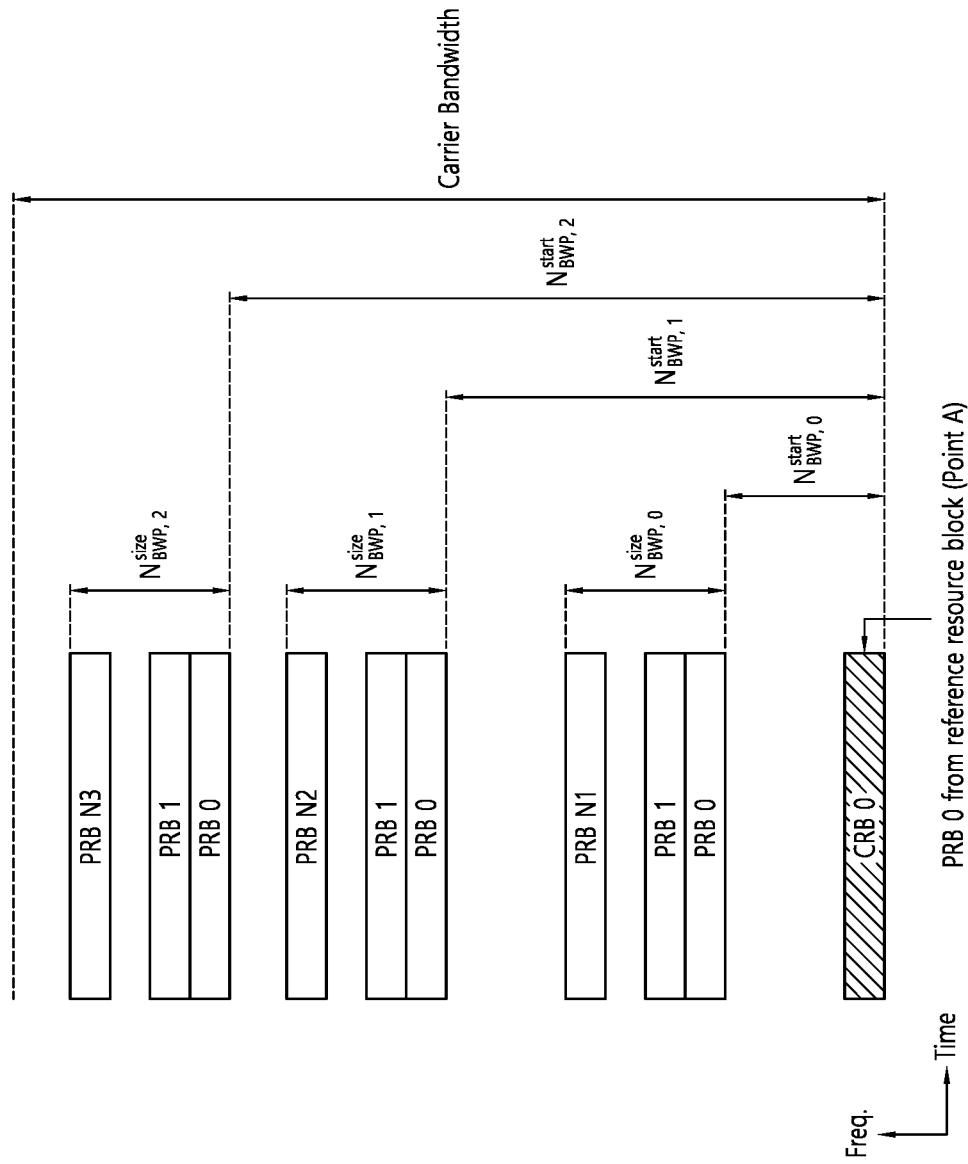
FIG. 8 shows a BWP based on an embodiment of the present disclosure.

FIG. 8 shows a BWP based on an embodiment of the present disclosure. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 9 shows a radio protocol architecture for a SL communication, in accordance with an embodiment of the present disclosure. The embodiment of FIG. 9 may be combined with various embodiments of the present disclosure. More specifically, (a) of FIG. 9 shows a user plane protocol stack of LTE, and (b) of FIG. 9 shows a control plane protocol stack of LTE.

FIG. 10 shows a radio protocol architecture for a SL communication, in accordance with an embodiment of the present disclosure. The embodiment of FIG. 10 may be combined with various embodiments of the present disclosure. More specifically, (a) of FIG. 10 shows a user plane protocol stack of NR, and (b) of FIG. 10 shows a control plane protocol stack of NR.

Hereinafter, a Sidelink Synchronization Signal (SLSS) and synchronization information will be described in detail.

The SLSS is a sidelink specific sequence, which may include a Primary Sidelink Synchronization Signal (PSSS) and a Secondary Sidelink Synchronization Signal (SSSS). The PSSS may be referred to as Sidelink Primary Synchronization Signal (S-PSS) and the SSSS may be referred to as Sidelink Secondary Synchronization Signal (S-SSS).

A Physical Sidelink Broadcast Channel (PSBCH) may refer to a (broadcast) channel through which (system) information, which consist of default (or basic) information that should first be known by the UE before the sidelink signal transmission/reception. For example, the default (or basic) information may be information related to the SLSS, a Duplex Mode (DM), TDD UL/DL configuration, information related to resource pools, types of applications related to the SLSS, a subframe offset, broadcast information, and so on.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. In addition, a frequency position of the S-SSB may be (pre-)configured. Accordingly, the UE does not need to perform hypothesis detection at frequency to discover the S-SSB in the carrier.

Each SLSS may have a physical layer sidelink synchronization identity (ID), and the values may be respectively equal to any one value ranging from 0 to 335. Depending upon any one of the above-described values that is used, a synchronization source may also be identified. For example, values of 0, 168, 169 may indicate the GNSS, values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
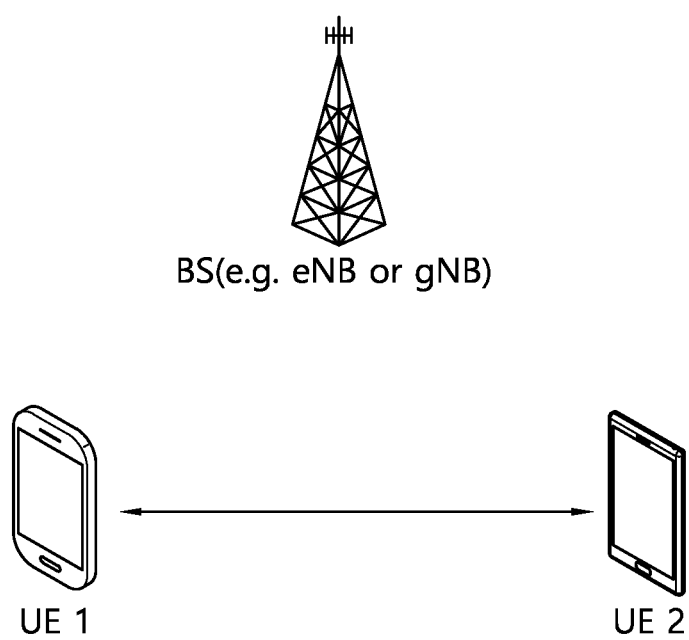
FIG. 11 shows a UE performing V2X or SL communication, in accordance with an embodiment of the present disclosure.

FIG. 11 shows a UE performing V2X or SL communication in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 12:
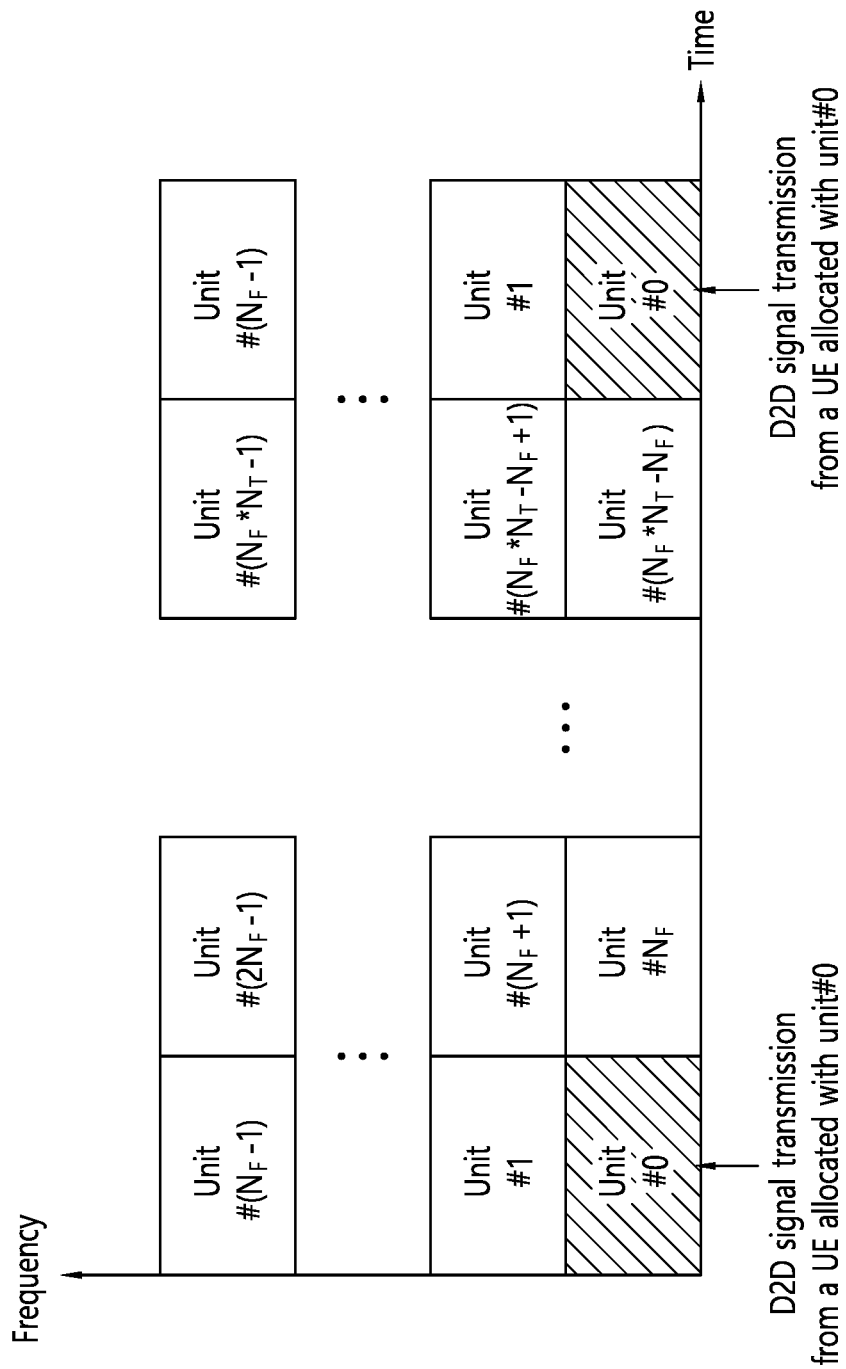
FIG. 12 shows a resource unit for V2X or SL communication based on an embodiment of the present disclosure.

FIG. 12 shows a resource unit for V2X or SL communication based on an embodiment of the present disclosure.

Referring to FIG. 12, all frequency resources of a resource pool may be divided into NF resources, and all time resources of the resource pool may be divided into NT resources. Therefore, NF*NT resource units may be defined in the resource pool. FIG. A12 may show an example of a case where a corresponding resource pool is repeated with a period of NT subframes.

As shown in FIG. 12, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, a resource allocation in sidelink will be described.

Figure 13:
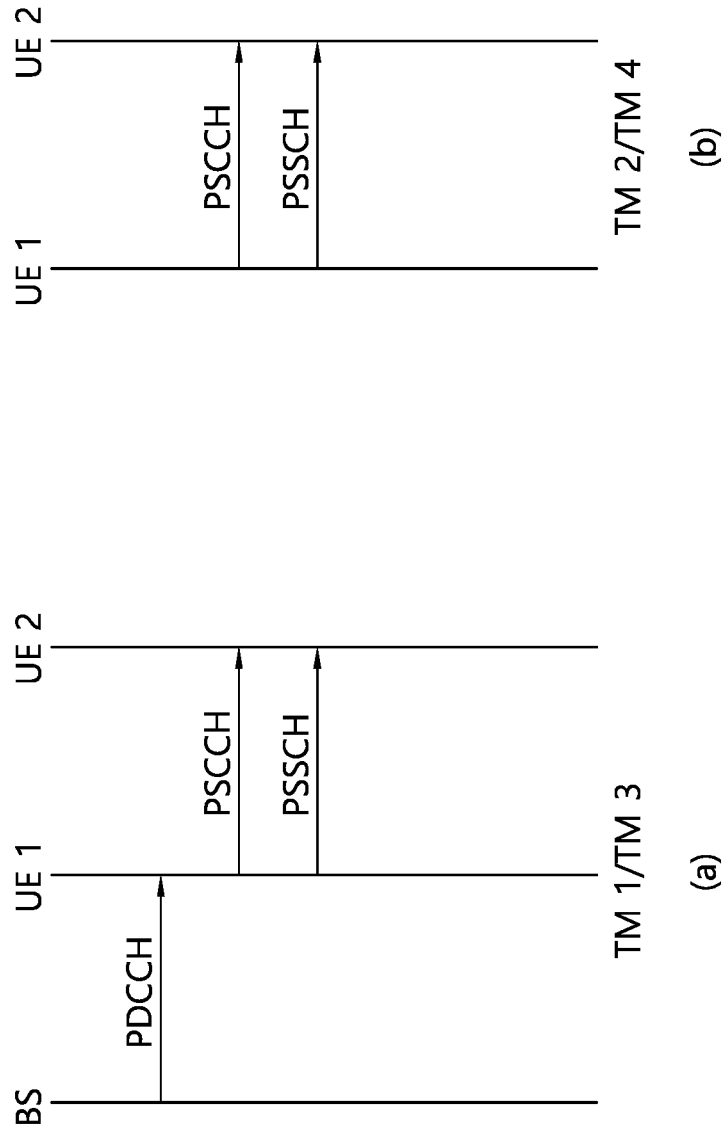
FIG. 13 shows exemplary UE operations according to a transmission mode (TM) related to V2X/D2D in accordance with an embodiment of the present disclosure.

FIG. 13 shows exemplary UE operations according to a transmission mode (TM) related to V2X/D2D in accordance with an embodiment of the present disclosure. More specifically, (a) of FIG. 13 shows UE operations related to Transmission mode 1 or Transmission mode 3, and (b) of FIG. 13 shows UE operations related to Transmission mode 2 or Transmission mode 4.

Referring to (a) of FIG. 13, in Transmission modes 1/3, the base station performs resource scheduling to UE 1 through a PDCCH (more specifically, DCI), and UE 1 performs sidelink/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to sidelink, and Transmission mode 3 may be applied to V2X.

Referring to (b) of FIG. 13, in Transmission modes 2/4 may be modes according to which the UE performs self-scheduling. More specifically, Transmission mode 2 may be applied to sidelink, wherein the UE may select a resource by itself from a configured resource pool and perform sidelink operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be abbreviated as Mode.

In case of NR sidelink, at least two types of sidelink resource allocation modes may be defined. In case of Mode 1, the base station may schedule sidelink resources that are to be used for sidelink transmission. In case of Mode 2, the user equipment (UE) may determine a sidelink transmission resource from sidelink resources that are configured by the base station/network or predetermined sidelink resources. The configured sidelink resources or the predetermined sidelink resources may be a resource pool. For example, in case of Mode 2, the UE may autonomously select a sidelink resource for transmission. For example, in case of Mode 2, the UE may assist (or help) sidelink resource selection of another UE. For example, in case of Mode 2, the UE may be configured with an NR configured grant for sidelink transmission. For example, in case of Mode 2, the UE may schedule sidelink transmission of another UE. And, Mode 2 may at least support reservation of sidelink resources for blind retransmission.

Procedures related to sensing and resource (re-)selection may be supported in Resource Allocation Mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL Reference Signal Received Power (RSRP) measurement, which is based on a Demodulation Reference Signal (SL DMRS). The resource (re-)selection procedure may use a result of the sensing procedure in order to determine the resource for the sidelink transmission.

Figure 14:
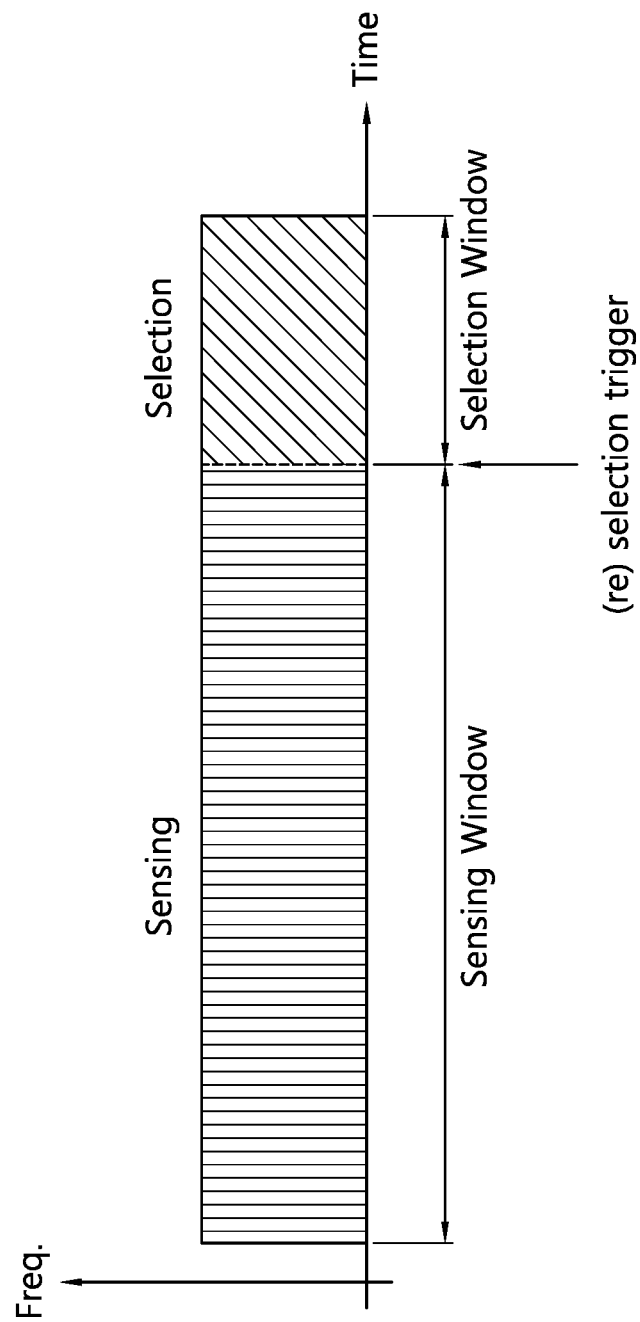
FIG. 14 shows an example of a selection of transmission resources in accordance with an embodiment of the present disclosure.

FIG. 14 shows an example of a selection of transmission resources in accordance with an embodiment of the present disclosure.

Referring to FIG. 14, by performing sensing within a sensing window, the UE may determine transmission resources reserved by another UE or transmission resources being used by another UE, and, after such transmission resources are excluded from the selection window, among the remaining resources, the UE may randomly select resources from resources having little interference.

For example, within the sensing window, the UE may decode the PSCCH including information on the cycle periods (or terms) of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure Received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Hereinafter, a hybrid automatic repeat request (HARQ) procedure will be described.

An error compensation scheme for securing communication reliability may include a Forward Error Correction (FEC) scheme and an Automatic Repeat Request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme and it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in Resource Allocation Mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback is enabled for unicast, in a non-code block group (non-CBG) operation, if the receiving UE successfully decodes a transport block, the receiving UE may generate HARQ-ACK. In addition, the receiving UE may transmit the HARQ-ACK to the transmitting UE. If the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes a related PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes a related PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Meanwhile, in sidelink communication, a first UE may transmit a PSCCH and/or a PSSCH by using all symbols in a slot. In this case, when there is a PSFCH to be received by the first UE from the second UE on different frequency resources in the same slot, a third UE receiving the PSCCH and/or the PSSCH may experience a large power fluctuation. Accordingly, the third UE needs to perform additional automatic gain control (AGC) to prevent large power fluctuations. For example, the PSCCH/PSSCH transmitted by the first UE may be configured such that a short additional AGC duration exists in a symbol that may require additional AGC. The additional AGC duration may be shorter than one OFDM symbol. For example, the UE may use the remaining part of the OFDM symbol excluding the additional AGC duration for transmitting and receiving sidelink information. According to various embodiments of the present disclosure, the UE may use a comb-type resource mapping in the frequency domain so that a signal on the same time domain is repeated in one symbol.

Hereinafter, a method and apparatus for performing an additional AGC by a UE according to various embodiments of the present disclosure will be described.

The reception operation of the UE may include a decoding operation and/or reception operation of a sidelink channel and/or a sidelink signal (e.g., PSCCH, PSSCH, PSFCH, PSBCH, PSSS/SSSS, etc.). The reception operation of the UE may include a decoding operation and/or reception operation of a WAN DL channel and/or a WAN DL signal (e.g., PDCCH, PDSCH, PSS/SSS, etc.). The reception operation of the UE may include a sensing operation and/or a CBR measurement operation. In various embodiments of the present disclosure, the sensing operation of the UE may include a PSSCH-RSRP measurement operation based on a PSSCH demodulation reference signal (DM-RS) sequence, a PSSCH-RSRP measurement operation based on a PSSCH DM-RS sequence scheduled by the PSCCH decoded by the UE successfully, a sidelink RSSI (S-RSSI) measurement operation and/or a S-RSSI measurement operation based on a sub-channel related to a V2X resource pool. In various embodiments of the present disclosure, the transmission operation of the UE may include a transmission operation of a sidelink channel and/or a sidelink signal (e.g., PSCCH, PSSCH, PSFCH, PSBCH, PSSS/SSSS, etc.). The transmission operation of the UE may include a transmission operation of a WAN UL channel and/or a WAN UL signal (e.g., PUSCH, PUCCH, SRS, etc.). In various embodiments of the present disclosure, the synchronization signal may include SLSS and/or PSBCH.

In various embodiments of the present disclosure, configuration may include signaling, signaling from a network, configuration from a network, and/or pre-configuration from a network. In various embodiments of the present disclosure, the definition may include signaling, signaling from a network, configuration from a network, and/or pre-configuration from a network. In various embodiments of the present disclosure, the designation may include signaling, signaling from a network, configuration from a network, and/or pre-configuration from a network.

In various embodiments of the present disclosure, for example, for convenience of description, a (physical) channel used when the receiving UE transmits at least one of sidelink HARQ feedback, sidelink CSI, or sidelink RSRP to the transmitting UE may be referred to as a PSFCH.

In various embodiments of the present disclosure, for example, the sidelink channel may include PSCCH, PSSCH, PSFCH, PSBCH, PSSS/SSSS, etc.

In various embodiments of the present disclosure, the sidelink information may include at least one of a sidelink message, a sidelink packet, a sidelink service, sidelink data, sidelink control information, and/or a sidelink transport block (TB). For example, the sidelink information may be transmitted through PSSCH and/or PSCCH.

Meanwhile, as described above, for example, the receiving UE may use or transmit the PSFCH to transmit feedback information (e.g., sidelink HARQ feedback, sidelink CSI, sidelink RSRP) to the transmitting UE through sidelink communication. For example, the transmitting UE may use or transmit the PSSCH to transmit sidelink data. For example, the transmitting UE may use or transmit the PSCCH to transmit scheduling information necessary for decoding the PSSCH.

For example, when the receiving UE uses or transmits a PSFCH to transmit feedback information, since a size of the feedback information is not large, the receiving UE may use a small number of symbols in the slot for the PSFCH transmission. For example, after the PSCCH related with the PSFCH and/or PSSCH related with the PSFCH is decoded, the PSFCH including feedback information related to the PSCCH and/or PSSCH may be generated. Accordingly, the PSFCH resource may be located after the PSCCH resource and/or the PSSCH resource in the time domain. For example, when the receiving UE quickly decodes the PSCCH and/or the PSSCH, the resource related to the PSFCH may be located in the same slot as the PSCCH resource related with the PSFCH and/or the PSSCH resource related with the PSFCH. For example, when the receiving UE slowly decodes the PSCCH and/or the PSSCH, the resources related to the PSFCH may be located in a slot different from the PSCCH resource related with the PSFCH and/or the PSSCH resource related with the PSFCH.

Meanwhile, in the NR Uu system, the UE may configure a BWP (e.g., Uu BWP) for each carrier for UL/DL transmission/reception in a cell. Herein, for example, BWP may be defined a set of contiguous physical resource blocks (PRBs) in a given numerology (i.e., subcarrier spacing). For example, the base station may configure up to four BWPs for UL/DL for to the UE, and the UE may determine one active BWP in which actual transmission/reception is performed for each the UL/DL. For example, load balancing for different BWPs, energy saving through RF switching and support of multiple UEs with different capabilities to support BW of various systems in a single cell may be possible through operation related to BWP.

For example, scenarios in which the UE can switch different BWPs may be as follows.

<BWP Switching Scenario>

For example scenario 1 may be that the UE changes the center frequency of a BWP without changing the bandwidth (BW).

For example, scenario 2 may be that the UE changes a BW without changing the center frequency of the BWP.

For example, scenario 3 may be that the UE changes the center frequency of a BWP and the BW.

For example, scenario 4 may be that the UE changes a SCS without changing the center frequency of a BWP and the BW.

In addition, in the BWP switching scenario, the UE may require a BWP switch delay according to the numerology. For example, Table 5 below may represent the BWP switch delay according to the numerology.

TABLE 5

| | | BWP switch delay $T_{BWPswitchDelay}$ (slot) | |
|---|---|---|---|
| u | NR slot length (ms) | Type 1 | Type 2 |
| 0 | 1 | [1] | [3] |
| 1 | 0.5 | [2] | [5] |
| 2 | 0.25 | [3] | [9] |
| 3 | 0.125 | [6] | [17] |

In Table 5, for example, u is a unit indicating sub-carrier spacing, and the BWP switch delay may vary according to the NR slot length. For example, the BWP switch delay may be divided into Type 1 and Type 2 according to the capability of the UE. For example, when the BWP switching operation is related to a change in sub-carrier spacing, the UE may determine the BWP switch delay based on a larger value among the sub-carrier spacing before BWP switching and the sub-carrier spacing after BWP switching.

Figure 15:
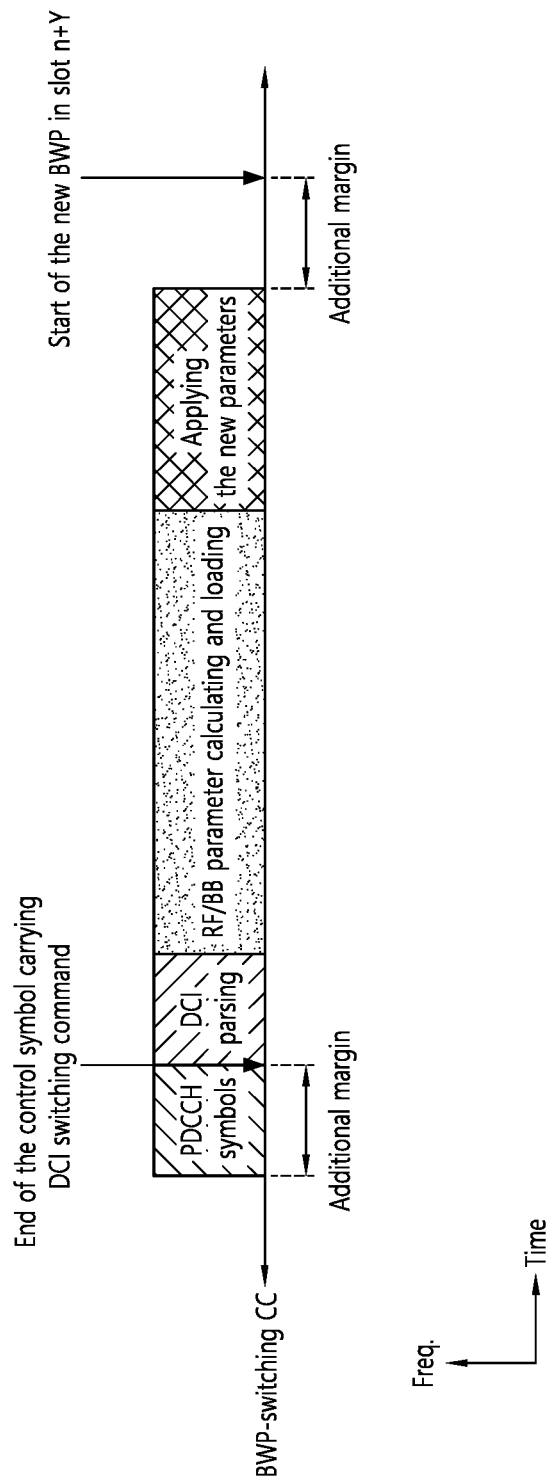
FIG. 15 shows an example of a UE performing a BWP switching operation between an uplink (UL) and a downlink (DL).

FIG. 15 shows an example of a UE performing a BWP switching operation between an uplink (UL) and a downlink (DL).

Referring to FIG. 15, for example, when the UE performs BWP switching between UL and DL, the UE may not perform transmission/reception operation during the BWP switching time period. For example, the UE may receive a control symbol transmitting a DCI switching command from the base station. For example, the UE may receive DCI transmitting the PDCCH by using three OFDM symbols. For example, the UE may parse the DCI, calculate and load RF/baseband (BB) parameters, and apply new parameters. Herein, calculating and loading the RF/BB parameters may mean a series of processes in which the UE switches the RF to the BWP for switching and calculates and applies the BB parameter to the switched RF. For example, when the UE receives a command for switching the UL BWP from the base station after DL reception, the UE may not perform DL reception while switching to the UL BWP (e.g., an additional margin period). For example, the UE may switch to a new BWP in slot n+Y.

Meanwhile, for example, in the NR V2X sidelink system, the UE may configure sidelink (SL) BWP for performing sidelink communication. For example, Uu BWP and SL BWP may be independent. For example, when the UE performs a switching operation between the configured Uu BWP and the configured SL BWP, a problem may occur in an interruption period for the switching operation. For example, when SL transmission is required for the UE after the UE configures the Uu BWP to communicate with the base station, the UE may perform a BWP switching operation for re-configure the SL BWP. In this case, the UE may require a BWP switching time to perform a BWP switching operation. For example, during the BWP switching time period, an interruption period in which the UE cannot perform the Uu transmit/receive operation and/or the SL transmit/receive operation may occur, and the UE may need to process the interruption period.

Figure 16:
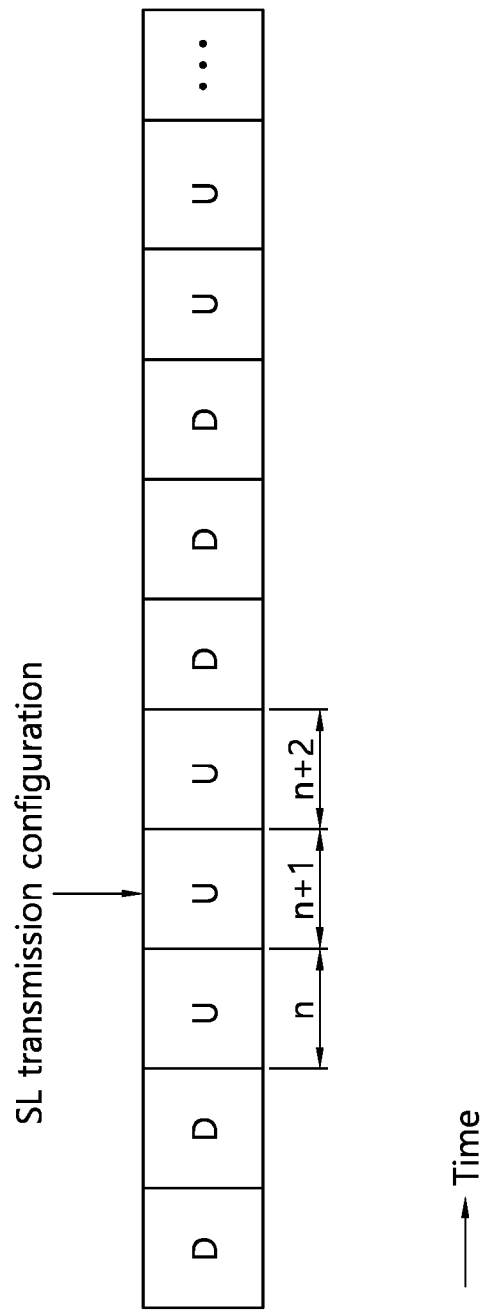
FIG. 16 shows an example of a BWP switching operation between UL and DL in a time division duplex (TDD) subframe.

FIG. 16 shows an example of a BWP switching operation between UL and DL in a TDD subframe.

Referring to FIG. 16, the UE may perform communication based on UL/DL of configured Uu communication. For example, when the UE is configured to perform sidelink transmission at time n+1, the UE may not perform sidelink transmission at time n+1, and may perform switching from Uu BWP to SL BWP at time n, and may perform sidelink transmission after the switching time period. For example, in the case of 15 kHz sub-carrier spacing, the BWP switching delay may occur for the UE from at least one slot to a maximum of three slots according to the capability of the UE. For example, when the BPW switching delay corresponds to one slot, the UE may perform sidelink transmission at time n+2. In this case, for example, an interruption period in which the UE cannot perform Uu/SL transmission and/or reception operation may occur at time n+1. And, when reception is required for the UE at time n+1, the interruption period may be undesirable.

According to various embodiments of the present disclosure, the Uu BWP and the SL BWP may be different from each other. For example, in the Uu BWP, the DL BWP and the UL BWP may be different from each other. For example, as described above, when the UE performs a BWP switching operation between the Uu BWP and the SL BWP, the timing according to the BWP switching may be required for the UE. For example, the UE may determine the timing according to the BWP switching based on Table 5 above. For example, when the UE performs a BWP switching operation from Uu BWP to SL BWP in 15 kHz sub-carrier spacing, the UE may require a switching operation period from at least one slot to a maximum of three slots.

In LTE V2X, for example, the UE may perform UL transmission or SL transmission in a configured subframe, according to which transmission has a higher priority based on prioritization between UL transmission and SL transmission.

On the other hand, due to the introduction of BWP in NR V2X, for example, when the UE performs a BWP switching operation between different BWPs, there may be a delay according to the BWP switching. For example, when the SL BWP is configured for the UE and the terminal dynamically switches from the Uu BWP to the SL BWP, an overlapping section may occur between the Uu BWP and the SL BWP in the frequency domain.

Additionally, for example, the UE cannot perform any transmission/reception operation in the time period for switching the BWP. Therefore, for example, when the base station determines that there is no problem even if the interruption period due to the switching occurs during the time period in which the BWP is switched by the UE, the UE may receive a BWP switching command from the base station. On the other hand, for example, when the UE itself switches from the Uu BWP to the SL BWP, the UE may not receive information to be received or monitored from the base station in the interruption period due to the switching operation. Therefore, the UE may need to perform a BWP switching operation based on a pre-configured rule. And/or, for example, the base station may notify the UE whether to perform a BWP switching operation or the base station may receive information related to the BWP switching from the UE.

According to various embodiments of the present disclosure, a method in which a UE performs a BWP switching operation in consideration of an interruption period for the BWP switching operation between Uu BWP and SL BWP will be described in detail. For example, the UE may perform a BWP switching operation according to which Uu/SL transmission and/or reception message is to be transmitted in the interruption period.

According to various embodiments of the present disclosure, for example, a first BWP may be a BWP currently used by the UE for transmission and/or reception. For example, a second BWP may be a BWP to be switched by the UE. For example, the UE may determine whether to transmit and/or receive information and/or signals in the first BWP based on a pre-configured rule. Herein, for example, the UE may switch from Uu BWP to SL BWP for transmission and/or reception related to sidelink information. For example, the UE may switch from the SL BWP to the Uu BWP for transmission and/or reception related to Uu communication. For example, the sidelink information may include at least one of sidelink data, sidelink control information, a sidelink service, and/or a sidelink packet.

Figure 17:
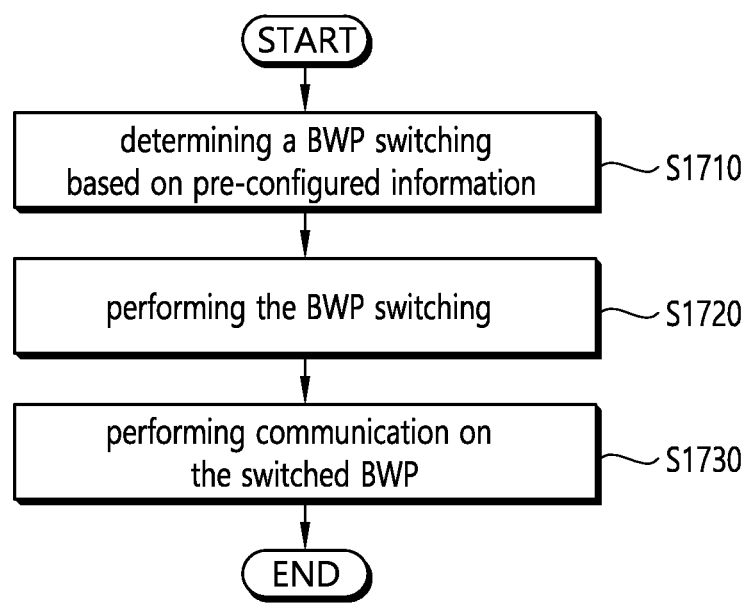
FIG. 17 shows a procedure for a UE to determine BWP switching based on pre-configured information, in accordance with an embodiment of the present disclosure.

FIG. 17 shows a procedure for a UE to determine BWP switching based on pre-configured information, in accordance with an embodiment of the present disclosure Referring to FIG. 17, in step S1710, the UE may determine a BWP switching based on pre-configured information. For example, the UE may determine whether to perform switching from the first BWP to the second BWP based on the pre-configured information. For example, the pre-configured information includes at least one of information related to the BWP, a latency value according to the BWP switching, information related to the time for the UE to perform communication on the second BWP, communication type, service type, priority, information related to synchronization, information related to system information, information related to a HARQ feedback, information related to CSI, information related to MIB and/or SIB, information related to paging and information related to whether the UE triggers resource reselection.

In step S1720, the UE may perform the BWP switching. For example, the UE may perform the BWP switching from the first BWP to the second BWP. For example, the first BWP may be any one of Uu BWP and SL BWP. For example, the second BWP may be any one of Uu BWP and SL BWP. For example, the UE may not perform SL communication and/or Uu communication during a time period for performing BWP switching.

In step S1730, the UE may perform communication on the switched BWP. For example, when the switched BWP is the Uu BWP, the UE may perform Uu communication with the base station on the switched Uu BWP. For example, when the switched BWP is the SL BWP, the UE may perform SL communication with another UE on the switched SL BWP.

Hereinafter, a method for the UE to perform the BWP switching based on pre-configured information will be described in more detail.

According to an embodiment of the present disclosure, for example, when the UE performs switching from Uu BWP to SL BWP, since the UE does not know when to perform monitoring related to Uu DL reception, the UE may need to fall back to the Uu BWP. Therefore, for example, when the UE performs Uu communication with the base station on the Uu BWP, the UE may perform switching from Uu BWP to SL BWP, and may fall back from the switched SL BWP to Uu BWP.

According to an embodiment of the present disclosure, for example, when the UE performs switching from SL BWP to Uu BWP, since the UE does not know when to perform the reception related to the sidelink, the UE may need to fall back to the SL BWP. Therefore, for example, when the UE performs SL communication with another UE on the SL BWP, the UE may perform switching from the SL BWP to the Uu BWP, and may fall back from the switched Uu BWP to the SL BWP.

For example, when the UE performs switching from Uu BWP to SL BWP and falls back from the switched SL BWP to Uu BWP, the UE may configure and/or define a first time parameter for determining whether to perform BWP switching. For example, when it is required for the UE to perform communication on the second BWP, the UE may need switching latency to perform switching from the first BWP to the second BWP. For example, the first time parameter may be determined based on Equation 1 below.

$$T_{BWP_{T1}} = \text{switching latency time}*2 + \text{time for maintaining the second } BWP \quad [\text{Equation 1}]$$

For example, $T_{BWP_{T1}}$ may be the first time parameter. For example, the first time parameter may be determined based on twice the switching latency time and the time to maintain the second BWP. For example, the switching latency time may be a time for the UE to perform BWP switching. For example, as described above, in order for the UE to fall back to the first BWP, since the switching operation from the first BWP to the second BWP and the switching operation from the second BWP to the first BWP are required, the first time parameter may be determined based on twice the switching latency time. For example, the time for maintaining the second BWP may be a time during which the UE performs communication on the switched second BWP. For example, the time for maintaining the second BWP may be a time for performing communication on the second BWP after the UE performs RF tuning and application of related BB parameters.

For example, a time period in which the UE performs uplink and/or downlink with the base station on the first BWP may overlap with a time period related to the first time parameter. And/or, a time period during which the UE performs sidelink transmission and/or reception with another UE on the first BWP may overlap with a time period related to the first time parameter. For example, when the overlap occurs, the UE may determine whether to switch the first BWP to the second BWP. For example, when the UE expects the overlap to occur, the UE may determine whether to switch the first BWP to the second BWP.

Figure 18:
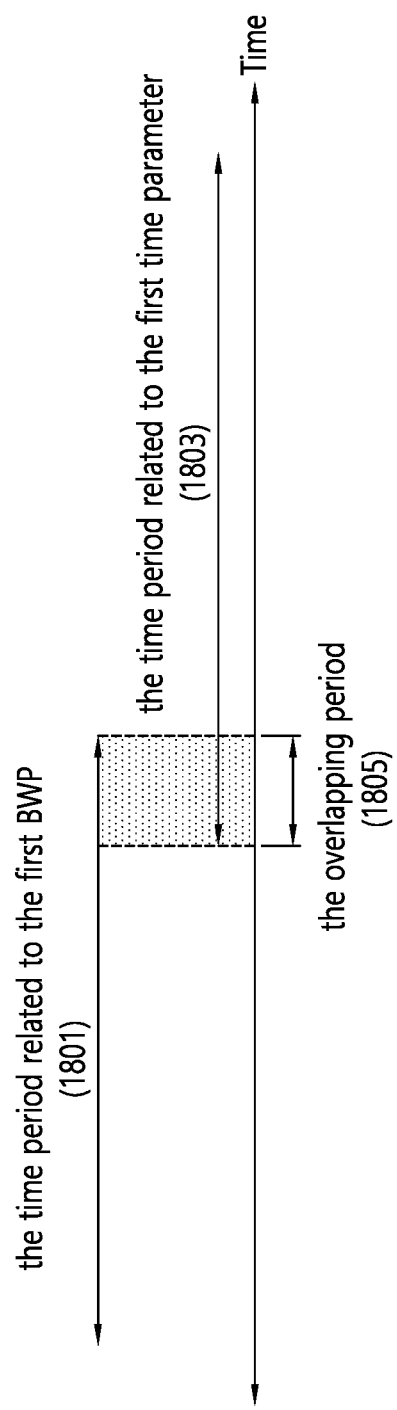
FIG. 18 shows an example in which a time period related to a first BWP and a time period related to the first time parameter overlap.

FIG. 18 shows an example in which a time period related to the first BWP and a time period related to the first time parameter overlap.

Referring to FIG. 18, when the time period related to the first BWP 1801 and the time period related to the first time parameter 1803 overlap, the UE may determine whether to switch the first BWP to the second BWP in the overlapping period 1805. For example, the UE may determine whether to switch the first BWP to the second BWP in the overlapping period 1805 based on pre-configured information. For example, the time period related to the first BWP 1801 may include a time period in which the UE performs uplink and/or downlink with the base station on the first BWP or a time period in which the UE performs sidelink transmission and/or reception with another UE on the first BWP. For example, the time period related to the first time parameter 1803 may include a time period for switching the first BWP to the second BWP, a time period for maintaining the switched second BWP and a time period for switching the second BWP to the first BWP. For example, the time period for maintaining the switched second BWP may include a time period in which the UE performs uplink and/or downlink with the base station on the second BWP or a time period in which the UE performs sidelink transmission and/or reception with another UE on the second BWP.

Figure 19:
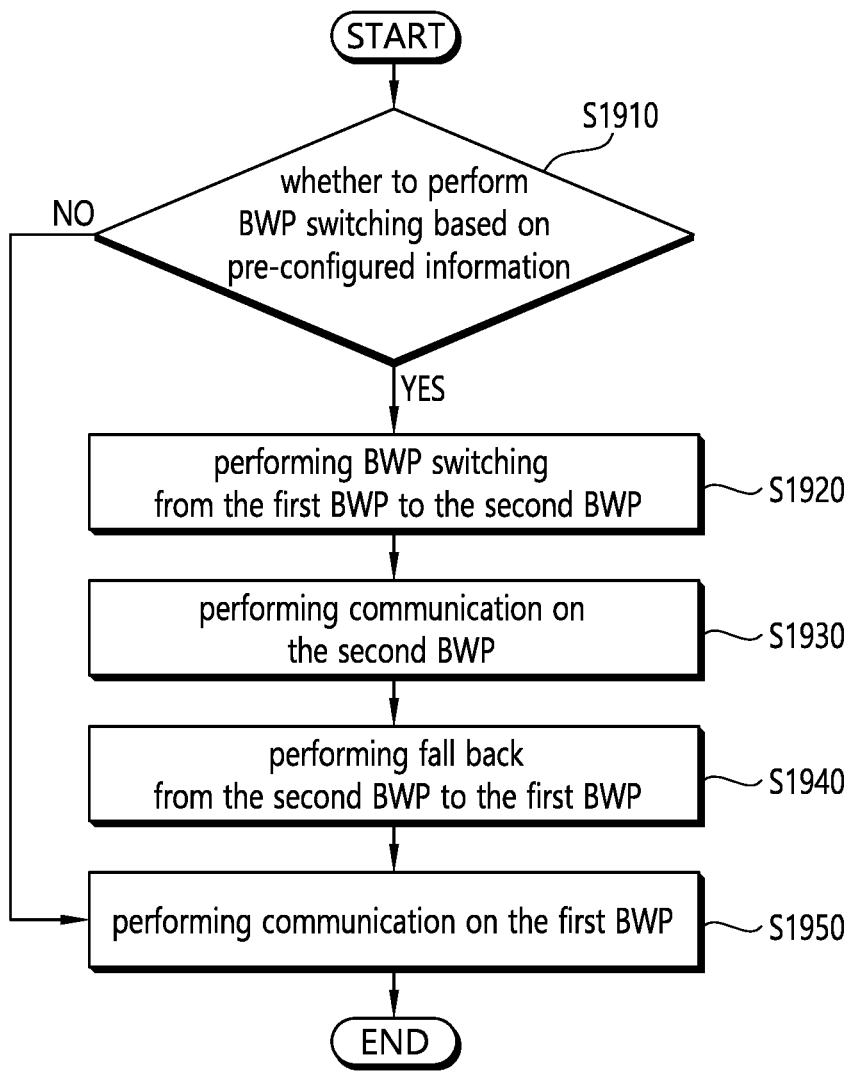
FIG. 19 shows a flowchart for a method for a UE to perform switching from a first BWP to a second BWP based on pre-configured information and to fall back to the first BWP, in accordance with an embodiment of the present disclosure.

FIG. 19 shows a flowchart for a method for a UE to perform switching from first BWP to second BWP based on pre-configured information and to fall back to the first BWP, in accordance with an embodiment of the present disclosure.

Referring to FIG. 19, in step S1910, the UE may determine whether to perform BWP switching based on pre-configured information. For example, the UE may determine whether a time period related to first BWP and a time period related to a first time parameter overlap based on the first time parameter. For example, when the time period related to the first BWP and the time period related to the first time parameter overlap, the UE may determine whether to switch from the first BWP to the second BWP. For example, when the UE performs Uu communication with the base station on the Uu BWP, it may be required to perform sidelink communication for the UE. In this case, for example, the UE may determine whether to switch from the Uu BWP to the SL BWP based on the first time parameter.

In step S1920, the UE may perform BWP switching from the first BWP to the second BWP. In step S1930, the UE may perform communication on the second BWP. For example, when the UE determines to perform BWP switching, the UE may perform BWP switching from the first BWP to the second BWP. For example, when the UE performs BWP switching from Uu BWP to SL BWP, the UE may perform sidelink communication with another UE on the switched SL BWP. For example, when the UE performs BWP switching from SL BWP to Uu BWP, the UE may perform Uu communication with the base station on the switched Uu BWP.

In step S1940, the UE may fall back from the second BWP to the first BWP. In step S1950, the UE may perform communication on the first BWP. For example, after a predetermined time period, the UE may fall back from the second BWP to the first BWP. For example, when the UE falls back to the Uu BWP, the UE may resume Uu communication with the base station on the Uu BWP. For example, when the UE falls back to the SL BWP, the UE may resume sidelink communication with another UE on the SL BWP.

Hereinafter, in the step S1910, a method for determining whether the UE performs BWP switching will be described in more detail.

According to an embodiment of the present disclosure, for example, the UE may determine whether to switch from the first BWP to the second BWP based on a pre-configured communication type or service type. Herein, for example, the communication type may include Uu communication (e.g., wide area network (WAN) UL and/or DL) and sidelink communication. Herein, for example, the service type may include at least one of a URLLC service, a public safety service or a broadcasting service. For example, the service type may be distinguished through a service ID. For example, the service ID may be an ID that can identify the V2X application in the upper layer. For example, when the UE performs Uu communication with the base station on the Uu BWP and the UE is required to switch to the SL BWP at a specific time, the UE may determine whether to switch according to a pre-configured communication type. In this case, for example, when the pre-configured communication type is sidelink communication or the pre-configured service type is a sidelink-related service, the UE may determine BWP switching from Uu BWP to SL BWP, and may perform sidelink communication on the switched SL BWP.

According to an embodiment of the present disclosure, for example, the UE may determine whether to switch from the first BWP to the second BWP based on a pre-configured threshold value. For example, the UE may determine whether to switch from the first BWP to the second BWP based on a pre-configured threshold value related to the first BWP. Herein, for example, the threshold value may be a value related to priority. For example, when the UE performs Uu communication with the base station on the Uu BWP, and the UE is required to switch to the SL BWP at a specific time, the UE may determine whether to switch based on a pre-configured threshold value. For example, while the UE performs Uu communication with the base station on the Uu BWP, and the UE may be required to switch to the SL BWP at a specific time point. In this case, for example, if a priority value related to sidelink transmission is higher than the pre-configured threshold value, the UE may determine BWP switching from Uu BWP to SL BWP. For example, if the priority value related to Uu communication is higher than the pre-configured threshold value, the UE may determine that the BWP switching operation (i.e., maintaining the first BWP (e.g., Uu BWP)) is not performed. For example, when a priority value related to sidelink transmission is higher than a pre-configured threshold value related to Uu communication, the UE may determine BWP switching from Uu BWP to SL BWP. According to various embodiments of the present disclosure, for example, the priority may be interchanged/replaced with at least one of logical channel prioritization (LCP), latency, reliability, minimum required communication range, PPPP, SLRB (Sidelink Radio Bearer), QoS profile, QoS parameters and/or the requirements.

According to an embodiment of the present disclosure, for example, the UE may determine whether to switch from the first BWP to the second BWP based on information related to channels/signaling or other information. For example, the channels/signaling may be pre-configured channels/signaling. Herein, for example, the information related to channels/signaling may include information related to SLSS/PSBCH, PUCCH/SRS, and SSB/PBCH. For example, the information related to channels/signaling may include information for channels/signaling related to synchronization. For example, the information related to the channels/signaling may include information for channels/signaling related to system information. For example, the other information may include information related to HARQ-ACK, information related to CSI, information related to MIB/SIB, and/or information related to paging. For example, the information related to the pre-configured channel may include information related to the pre-configured signaling. For example, when the UE is required to switch to the SL BWP at a specific time while the UE performs Uu communication with the base station on the Uu BWP, the UE may determine whether to perform BWP switching based on information related to pre-configured channels/signaling or other information. For example, when a time period for receiving system information related to DL (e.g., DL SSB/PBCH) overlaps with a time period related to the first time parameter, the UE may not perform BWP switching from Uu BWP to SL BWP in order to receive the system information related to DL. For example, when the UE expects that the time period for receiving system information related to DL (e.g., DL SSB/PBCH) overlaps with a time period related to the first time parameter, UE may not perform BWP switching from Uu BWP to SL BWP in order to receive the system information related to DL.

According to an embodiment of the present disclosure, for example, when resource reselection related to sidelink communication is triggered, the UE may determine whether to switch from the first BWP to the second BWP. For example, when switching from Uu BWP to SL BWP is requested for the UE, the UE in which resource reselection for sidelink communication is triggered may determine whether to switch from Uu BWP to SL BWP. For example, the UE may perform a BWP switching operation for a time period required for resource reselection.

According to an embodiment of the present disclosure, for example, when the UE performs communication related to transmission mode 1 in which the base station performs resource scheduling to the UE, the UE may determine whether to switch from the first BWP to the second BWP. For example, the base station may determine in advance an interruption period due to BWP switching, and perform scheduling in consideration of the interruption period. Therefore, for example, when the UE performs Uu communication with the base station on the Uu BWP, and a time period related to the Uu BWP and a time period related to the SL BWP overlap, the UE may determine BWP switching from Uu BWP to SL BWP based on information related to transmission mode 1. That is, for example, if the UE needs to perform communication related to transmission mode 1, the UE may perform BWP switching to use the SL BWP.

For example, various embodiments of the present disclosure described above may be combined with various proposed methods and/or procedures.

According to an embodiment of the present disclosure, for example, the UE may receive information related to the BWP from the network or from neighboring UEs (e.g., UEs performing Uu communication or UEs performing sidelink communication). Herein, for example, the information related to BWP may include at least one of a location and/or a period for time/frequency resources of each BWP, a center frequency of each BWP, BWP switching time between SL BWP and Uu BWP, potential need for BWP switching (e.g., whether BWP switching is required according to the type of packet to be transmitted by the UE), numerology for each BWP and/or information related to sidelink communication (e.g., a sidelink service/communication type, a priority of service to be transmitted, delay/reliability requirements, information related to resource reservation/scheduling). For example, the UE may transmit information related to BWP switching for the UE to neighboring UEs. For example, the information related to BWP switching may include at least one of information on attempted the BWP switching, information related to the first BWP in which the BWP switching operation is to be performed, a time required for the BWP switching, information on whether BWP switching is required, or a time to perform communication on the second BWP after performing the BWP switching. For example, after performing BWP switching, the UE may signal a time period or a gap for performing communication on the switched BWP to neighboring UEs. For example, neighboring UEs may not perform sidelink communication during the time period or the gap signaled from the UE. For example, after performing BWP switching, the UE may notify neighboring UEs of whether the UE has switched BWP. For example, in partial coverage, in-coverage UEs may signal information related to BWP switching and/or information related to an interruption period due to BWP switching to out-of-coverage UEs.

According to an embodiment of the present disclosure, for example, the UE may determine to perform BWP switching from the first BWP to the second BWP, and may drop a packet to be transmitted on the first BWP. For example, when the UE falls back to the first BWP after BWP switching, if the latency budget of the packet to be transmitted on the first BWP before is sufficiently left, the UE may perform transmission of the delayed packet on the first BWP. For example, when Uu communication is required for the UE while the UE is performing sidelink transmission on the SL BWP, the UE may perform BWP switching from SL BWP to Uu BWP based on prioritization between BWPs. Then, for example, when the UE falls back from Uu BWP to SL BWP, if a delay requirement of a packet whose transmission is interrupted on the SL BWP before BWP switching is satisfied, the UE may transmit the packet whose transmission has been stopped. For example, when the UE falls back to the first BWP, the UE may transmit a packet whose transmission is stopped on the first BPW by using reserved resources. That is, since the UE transmits the packet that was interrupted before the fallback using the reserved resources, it may not affect the message and/or the packet to be currently transmitted. For example, the UE may perform one-shot transmission for a packet interrupted on the first BPW for short latency. For example, in the case of a UE capable of multi-carrier transmission, the UE may switch from SL BWP to Uu BWP in carrier component 1 (CC1), and the UE may transmit a packet whose sidelink transmission is stopped in carrier component 2 (CC2).

According to an embodiment of the present disclosure, for example, the UE may report information related to BWP switching to the base station based on the BWP configuration received from the base station. For example, the information related to BWP switching may include at least one of information on attempted the BWP switching, information related to the first BWP in which the BWP switching operation is to be performed, a time required for the BWP switching, information on whether the BWP switching is required, or a time to perform communication on the second BWP after performing the BWP switching. For example, the UE may report to the base station whether BWP switching is required and/or the BWP switching time period based on the BWP configuration received from the base station. For example, the conditions for the time period required for BWP switching may be different according to the implementation of the UE. For example, when a plurality of first BWPs and one second BWP are configured for the UE, the UE may report information related to the first BWP to be switched among the plurality of first BWPs, a time required for BWP switching, whether BWP switching is required, and/or a time to perform communication on the second BWP after performing BWP switching to the base station. For example, when a plurality of Uu BWPs and one SL BWP are configured for the UE, the UE may report the Uu BWP to be switched among the plurality of Uu BWPs and/or a time required for BWP switching to the base station. And/or the UE may report whether BWP switching is required (e.g., there may be candidates that do not support BWP operation among a plurality of Uu BWPs according to the implementation of the UE) and/or a time to communicate on SL BWP after performing BWP switching to the base station. For example, the base station may transmit a BWP switching command to the UE based on information related to the BWP switching received from the UE so that a collision does not occur between the Uu communication and the sidelink communication due to the BWP switching.

According to an embodiment of the present disclosure, for example, the UE may independently perform BWP switching from SL BWP to Uu BWP and BWP switching from Uu BWP to SL BWP. For example, when communication related to the second BWP is required while the UE is performing communication on the first BWP, the UE may perform BWP switching based on pre-configured information. Then, for example, when the UE falls back from the second BWP to the first BWP in order to perform communication related to the first BWP again, the UE may perform BWP switching based on pre-configured information. For example, when BWP switching to SL BWP is required for sidelink communication while the UE performs Uu communication with the base station on Uu BWP, the UE may perform BWP switching based on pre-configured information. Then, for example, when the UE falls back to Uu BWP for monitoring downlink reception, the UE may perform BWP switching based on pre-configured information.

For example, when the UE performs BWP switching, the UE may configure and/or define a second time parameter for determining whether to perform BWP switching. For example, when the UE is required to perform sidelink communication on the SL BWP while performing Uu communication with the base station on the Uu BWP, the UE may need a switching latency to perform switching from the Uu BWP to the SL BWP. For example, the second time parameter may be determined based on Equation 2 below.

$$T_{BWPY2} = \text{switching latency time} + \text{time for maintaining the switched } BWP \quad \text{[Equation 2]}$$

For example, $T_{BWP,2}$ may be the second time parameter. For example, the second time parameter may be determined based on the switching latency time and the time to maintain the switched BWP. For example, the switching latency time may be a time for the UE to perform BWP switching. For example, the time for maintaining the switched BWP may be a time during which the UE performs communication on the switched second BWP. For example, the time for maintaining the switched BWP may be a time for performing communication on the switched BWP after the UE performs RF tuning and application of related BB parameters. For example, the UE may determine whether to perform BWP switching based on pre-configured information for each of a plurality of BWP switching operations.

For example, the time period in which the UE performs uplink and/or downlink with the base station on the first BWP or the time period in which the UE performs sidelink transmission and/or reception with another UE on the first BWP may overlap the time period related to the second time parameter. For example, the time period related to the second time parameter may include a time period for switching the BWP and a time period for maintaining the switched BWP. For example, when the overlap occurs, the UE may determine whether to switch the first BWP to the second BWP. For example, when the UE expects the overlap to occur, the UE may determine whether to switch the first BWP to the second BWP.

For example, after the UE performs switching from the first BWP to the second BWP, the UE may not receive a switching command to the first BWP until a pre-configured time. In this case, for example, the UE may switch to the first BWP after the pre-configured time. For example, when the UE performs switching from Uu BWP to SL BWP, the UE may switch to the Uu BWP after the pre-configured time.

Figure 20:
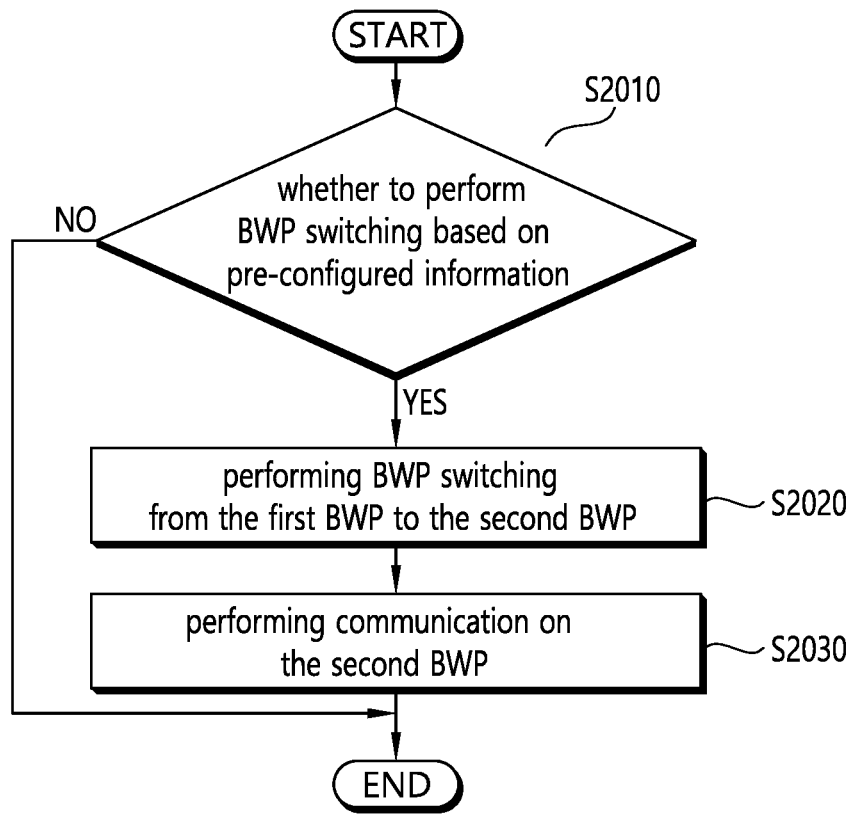
FIG. 20 shows a flowchart for a method for a UE to perform BWP switching based on pre-configured information, in accordance with an embodiment of the present disclosure.

FIG. 20 shows a flowchart for a method for a UE to perform BWP switching based on pre-configured information, in accordance with an embodiment of the present disclosure.

Referring to FIG. 20, in step S2010, the UE may determine whether to perform BWP switching based on pre-configured information. For example, the UE may determine whether a time period related to first BWP and a time period related to a second time parameter overlap based on the second time parameter. For example, when the time period related to the first BWP and the time period related to the second time parameter overlap, the UE may determine whether to switch from the first BWP to the second BWP. For example, when the UE performs Uu communication with the base station on the Uu BWP, it may be required to perform sidelink communication for the UE. In this case, for example, the UE may determine whether to switch from the Uu BWP to the SL BWP based on the second time parameter.

In step S2020, the UE may perform BWP switching from the first BWP to the second BWP. In step S2030, the UE may perform communication on the second BWP. For example, when the UE determines to perform BWP switching, the UE may perform BWP switching from the first BWP to the second BWP. For example, when the UE performs BWP switching from Uu BWP to SL BWP, the UE may perform sidelink communication with another UE on the switched SL BWP. For example, when the UE performs BWP switching from SL BWP to Uu BWP, the UE may perform Uu communication with the base station on the switched Uu BWP.

For example, when the UE performs communication on the switched second BWP, the UE may switch to the first BWP after a pre-configured time. For example, when the UE performs sidelink communication on the switched SL BWP, the UE may perform switching from the SL BWP to the Uu BWP after a pre-configured time.

Hereinafter, in the step S2010, a method for determining whether the UE performs BWP switching will be described in more detail.

According to an embodiment of the present disclosure, for example, the UE may determine whether to switch from the first BWP to the second BWP based on a pre-configured communication type or service type. Herein, for example, the communication type may include Uu communication (e.g., wide area network (WAN) UL and/or DL) and sidelink communication. Herein, for example, the service type may include at least one of a URLLC service, a public safety service or a broadcasting service. For example, the service type may be distinguished through a service ID. For example, the service ID may be an ID that can identify the V2X application in the upper layer. For example, when the UE performs Uu communication with the base station on the Uu BWP and the UE is required to switch to the SL BWP at a specific time, the UE may determine whether to switch according to a pre-configured communication type. In this case, for example, when the pre-configured communication type is sidelink communication or the pre-configured service type is a sidelink-related service, the UE may determine BWP switching from Uu BWP to SL BWP, and may perform sidelink communication on the switched SL BWP.

According to an embodiment of the present disclosure, for example, the UE may determine whether to switch from the first BWP to the second BWP based on a pre-configured threshold value. For example, the UE may determine whether to switch from the first BWP to the second BWP based on a pre-configured threshold value related to the first BWP. Herein, for example, the threshold value may be a value related to priority. For example, when the UE performs Uu communication with the base station on the Uu BWP, and the UE is required to switch to the SL BWP at a specific time, the UE may determine whether to switch based on a pre-configured threshold value. For example, while the UE performs Uu communication with the base station on the Uu BWP, and the UE may be required to switch to the SL BWP at a specific time point. In this case, for example, if a priority value related to sidelink transmission is higher than the pre-configured threshold value, the UE may determine BWP switching from Uu BWP to SL BWP. For example, if the priority value related to Uu communication is higher than the pre-configured threshold value, the UE may determine that the BWP switching operation (i.e., maintaining the first BWP (e.g., Uu BWP)) is not performed. For example, when a priority value related to sidelink transmission is higher than a pre-configured threshold value related to Uu communication, the UE may determine BWP switching from Uu BWP to SL BWP. According to various embodiments of the present disclosure, for example, the priority may be interchanged/replaced with at least one of logical channel prioritization (LCP), latency, reliability, minimum required communication range, PPPP, SLRB (Sidelink Radio Bearer), QoS profile, QoS parameters and/or the requirements.

According to an embodiment of the present disclosure, for example, the UE may determine whether to switch from the first BWP to the second BWP based on information related to channels/signaling or other information. For example, the channels/signaling may be pre-configured channels/signaling. Herein, for example, the information related to channels/signaling may include information related to SLSS/

PSBCH, PUCCH/SRS, and SSB/PBCH. For example, the information related to channels/signaling may include information for channels/signaling related to synchronization. For example, the information related to the channels/signaling may include information for channels/signaling related to system information. For example, the other information may include information related to HARQ-ACK, information related to CSI, information related to MIB/SIB, and/or information related to paging. For example, the information related to the pre-configured channel may include information related to the pre-configured signaling. For example, when the UE is required to switch to the SL BWP at a specific time while the UE performs Uu communication with the base station on the Uu BWP, the UE may determine whether to perform BWP switching based on information related to pre-configured channels/signaling or other information. For example, when a time period for receiving system information related to DL (e.g., DL SSB/PBCH) overlaps with a time period related to the first time parameter, the UE may not perform BWP switching from Uu BWP to SL BWP in order to receive the system information related to DL. For example, when the UE expects that the time period for receiving system information related to DL (e.g., DL SSB/PBCH) overlaps with a time period related to the first time parameter, UE may not perform BWP switching from Uu BWP to SL BWP in order to receive the system information related to DL.

According to an embodiment of the present disclosure, for example, when resource reselection related to sidelink communication is triggered, the UE may determine whether to switch from the first BWP to the second BWP. For example, when switching from Uu BWP to SL BWP is requested for the UE, the UE in which resource reselection for sidelink communication is triggered may determine whether to switch from Uu BWP to SL BWP. For example, the UE may perform a BWP switching operation for a time period required for resource reselection.

According to an embodiment of the present disclosure, for example, when the UE performs communication related to transmission mode 1 in which the base station performs resource scheduling to the UE, the UE may determine whether to switch from the first BWP to the second BWP. For example, the base station may determine in advance an interruption period due to BWP switching, and perform scheduling in consideration of the interruption period. Therefore, for example, when the UE performs Uu communication with the base station on the Uu BWP, and a time period related to the Uu BWP and a time period related to the SL BWP overlap, the UE may determine BWP switching from Uu BWP to SL BWP based on information related to transmission mode 1. That is, for example, if the UE needs to perform communication related to transmission mode 1, the UE may perform BWP switching to use the SL BWP.

For example, various embodiments of the present disclosure described above may be combined with various proposed methods and/or procedures.

According to an embodiment of the present disclosure, for example, the UE may receive information related to the BWP from the network or from neighboring UEs (e.g., UEs performing Uu communication or UEs performing sidelink communication). Herein, for example, the information related to BWP may include at least one of a location and/or a period for time/frequency resources of each BWP, a center frequency of each BWP, BWP switching time between SL BWP and Uu BWP, potential need for BWP switching (e.g., whether BWP switching is required according to the type of packet to be transmitted by the UE), numerology for each BWP and/or information related to sidelink communication (e.g., a sidelink service/communication type, a priority of service to be transmitted, delay/reliability requirements, information related to resource reservation/scheduling). For example, the UE may transmit information related to BWP switching for the UE to neighboring UEs. For example, the information related to BWP switching may include at least one of information on attempted the BWP switching, information related to the first BWP in which the BWP switching operation is to be performed, a time required for the BWP switching, information on whether BWP switching is required, or a time to perform communication on the second BWP after performing the BWP switching. For example, after performing BWP switching, the UE may signal a time period or a gap for performing communication on the switched BWP to neighboring UEs. For example, neighboring UEs may not perform sidelink communication during the time period or the gap signaled from the UE. For example, after performing BWP switching, the UE may notify neighboring UEs of whether the UE has switched BWP. For example, in partial coverage, in-coverage UEs may signal information related to BWP switching and/or information related to an interruption period due to BWP switching to out-of-coverage UEs.

According to an embodiment of the present disclosure, for example, the UE may determine to perform BWP switching from the first BWP to the second BWP, and may drop a packet to be transmitted on the first BWP. For example, when the UE falls back to the first BWP after BWP switching, if the latency budget of the packet to be transmitted on the first BWP before is sufficiently left, the UE may perform transmission of the delayed packet on the first BWP. For example, when Uu communication is required for the UE while the UE is performing sidelink transmission on the SL BWP, the UE may perform BWP switching from SL BWP to Uu BWP based on prioritization between BWPs. Then, for example, when the UE falls back from Uu BWP to SL BWP, if a delay requirement of a packet whose transmission is interrupted on the SL BWP before BWP switching is satisfied, the UE may transmit the packet whose transmission has been stopped. For example, when the UE falls back to the first BWP, the UE may transmit a packet whose transmission is stopped on the first BPW by using reserved resources. That is, since the UE transmits the packet that was interrupted before the fallback using the reserved resources, it may not affect the message and/or the packet to be currently transmitted. For example, the UE may perform one-shot transmission for a packet interrupted on the first BPW for short latency. For example, in the case of a UE capable of multi-carrier transmission, the UE may switch from SL BWP to Uu BWP in carrier component 1 (CC1), and the UE may transmit a packet whose sidelink transmission is stopped in carrier component 2 (CC2).

According to an embodiment of the present disclosure, for example, the UE may report information related to BWP switching to the base station based on the BWP configuration received from the base station. For example, the information related to BWP switching may include at least one of information on attempted the BWP switching, information related to the first BWP in which the BWP switching operation is to be performed, a time required for the BWP switching, information on whether the BWP switching is required, or a time to perform communication on the second BWP after performing the BWP switching. For example, the UE may report to the base station whether BWP switching is required and/or the BWP switching time period based on the BWP configuration received from the base station. For example, the conditions for the time period required for BWP switching may be different according to the implementation of the UE. For example, when a plurality of first BWPs and one second BWP are configured for the UE, the UE may report information related to the first BWP to be switched among the plurality of first BWPs, a time required for BWP switching, whether BWP switching is required, and/or a time to perform communication on the second BWP after performing BWP switching to the base station. For example, when a plurality of Uu BWPs and one SL BWP are configured for the UE, the UE may report the Uu BWP to be switched among the plurality of Uu BWPs and/or a time required for BWP switching to the base station. And/or the UE may report whether BWP switching is required (e.g., there may be candidates that do not support BWP operation among a plurality of Uu BWPs according to the implementation of the UE) and/or a time to communicate on SL BWP after performing BWP switching to the base station. For example, the base station may transmit a BWP switching command to the UE based on information related to the BWP switching received from the UE so that a collision does not occur between the Uu communication and the sidelink communication due to the BWP switching.

Figure 21:
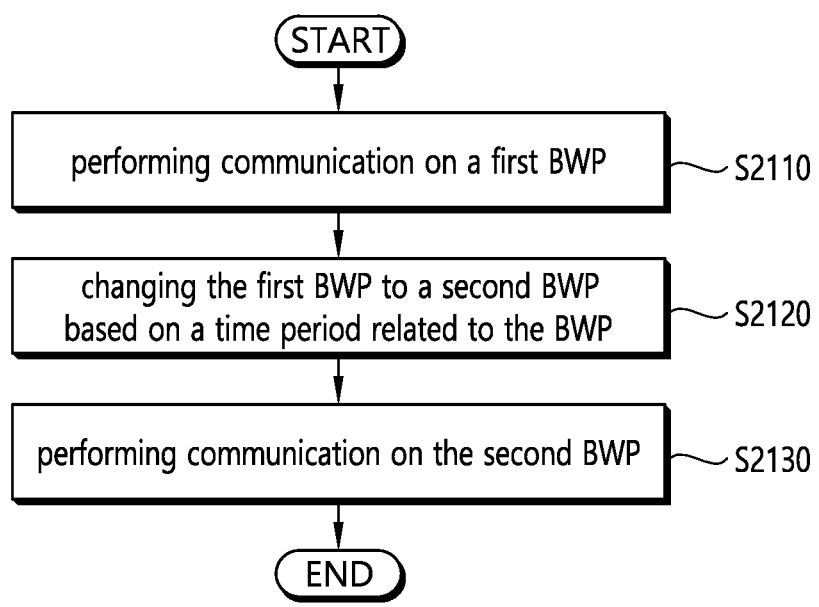
FIG. 21 shows a method for the first apparatus 100 to perform BWP switching, in accordance with an embodiment of the present disclosure.

FIG. 21 shows a method for the first apparatus 100 to perform BWP switching, in accordance with an embodiment of the present disclosure.

Referring to FIG. 21, in step S2110, the first apparatus 100 may perform communication on a first BWP. For example, the first BWP may be a BWP currently used by the first apparatus 100 for transmission and/or reception. For example, the first BWP may be any one of Uu BWP and SL BWP. For example, when the first BWP is the Uu BWP, the first apparatus 100 may perform Uu communication with a base station on the first BWP. For example, when the first BWP is the SL BWP, the first apparatus 100 may perform sidelink communication with another UE on the first BWP.

In step S2120, the first apparatus 100 may change the first BWP to a second BWP based on a time period related to the BWP. For example, the first apparatus 100 may determine that the time period related to the BWP overlaps the time interval related to the first BWP. For example, the time period related to the BWP may include twice the time period for a time to switch the BWP and a time period for performing communication on the second BWP. Also, for example, the time period related to the BWP may include a time period for switching the BWP and a time period for performing communication on the second BWP. For example, the first apparatus 100 may change the first BWP to the second BWP based on a pre-configured communication type and a pre-configured service type. For example, the first apparatus 100 may change the first BWP to the second BWP based on a threshold value related to a pre-configured priority. For example, the first apparatus 100 may change the first BWP to the second BWP based on information related to a pre-configured channel. For example, the information related to the pre-configured channel may include information related to a pre-configured signaling. For example, the first apparatus 100 may change the first BWP to the second BWP based on triggering of resource reselection related to sidelink communication. For example, the first apparatus 100 may change the first BWP to the second BWP based on performing communication related to transmission mode 1.

In step S2130, the first apparatus 100 may perform communication on the second BWP. For example, the second BWP may be a BWP to be switched by the UE. For example, the second BWP may be any one of Uu BWP and SL BWP. For example, when the second BWP is the Uu BWP, the first apparatus 100 may perform Uu communication with the base station on the second BWP. For example, when the second BWP is the SL BWP, the first apparatus 100 may perform sidelink communication with another UE on the second BWP.

For example, the first apparatus 100 may change back to the first BWP from the second BWP after the time period related to the BWP. For example, the first apparatus 100 may determine whether a delay requirement of a packet whose transmission is stopped on the first BWP is satisfied in the time period related to the re-changed first BWP. For example, the first apparatus 100 may transmit the packet whose transmission is stopped on the first BWP by using a reserved resource based on satisfying the delay requirement of the packet whose transmission is stopped on the first BWP.

For example, the first apparatus 100 may transmit information related to BWP switching to neighboring UEs or network. For example, the information related to BWP switching may include at least one of information related to the first BWP, time information required for BWP switching, information on whether BWP switching is required, or time information for performing communication on the second BWP after performing BWP switching.

For example, the first apparatus 100 may receive information related to the BWP from neighboring UEs or network. For example, the information related to BWP may include at least one of a location and a period of time resource of each BWP, a location and a period of frequency resource of each BWP, a center frequency of each BWP, BWP switching time between SL BWP and Uu BWP, whether there is a potential need for BWP switching, numerology for each BWP, or information related to sidelink communication.

Since examples of the above-described proposed method may also be included as one of the implementation methods of the present disclosure, it is obvious that they may be regarded as a kind of proposed method. In addition, the above-described proposed methods may be implemented independently, but may also be implemented in the form of a combination (or merge) of some of the proposed methods. Rules may be defined so that the base station informs the terminal or the transmitting terminal informs the receiving terminal information on whether the proposed methods are applied (or information on the rules of the proposed methods) through a predefined signal (e.g., a physical layer signal or a higher layer signal).

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
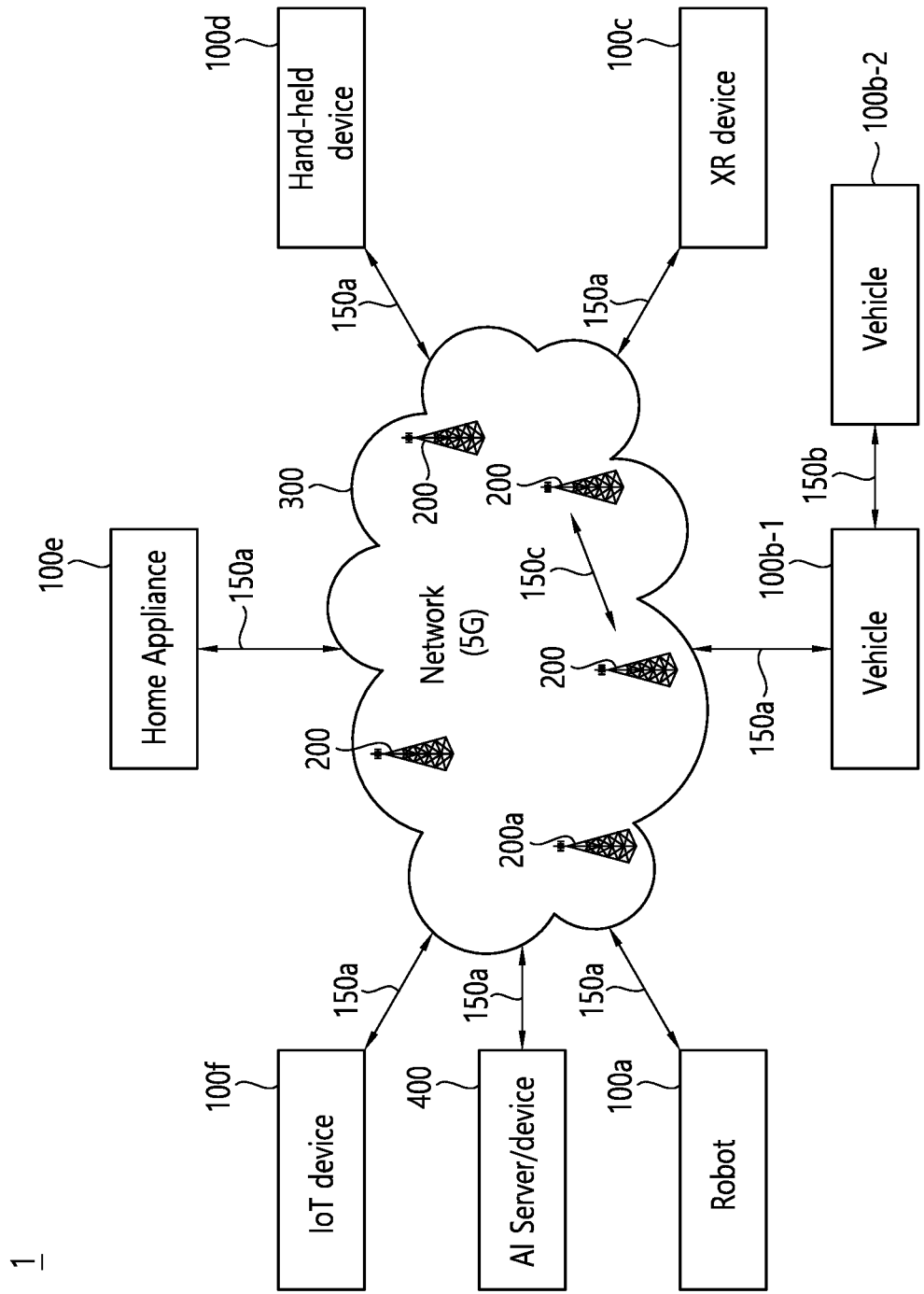
FIG. 22 shows a communication system (1), in accordance with an embodiment of the present disclosure.

FIG. 22 shows a communication system (1), in accordance with an embodiment of the present disclosure.

Referring to FIG. 22, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f, and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
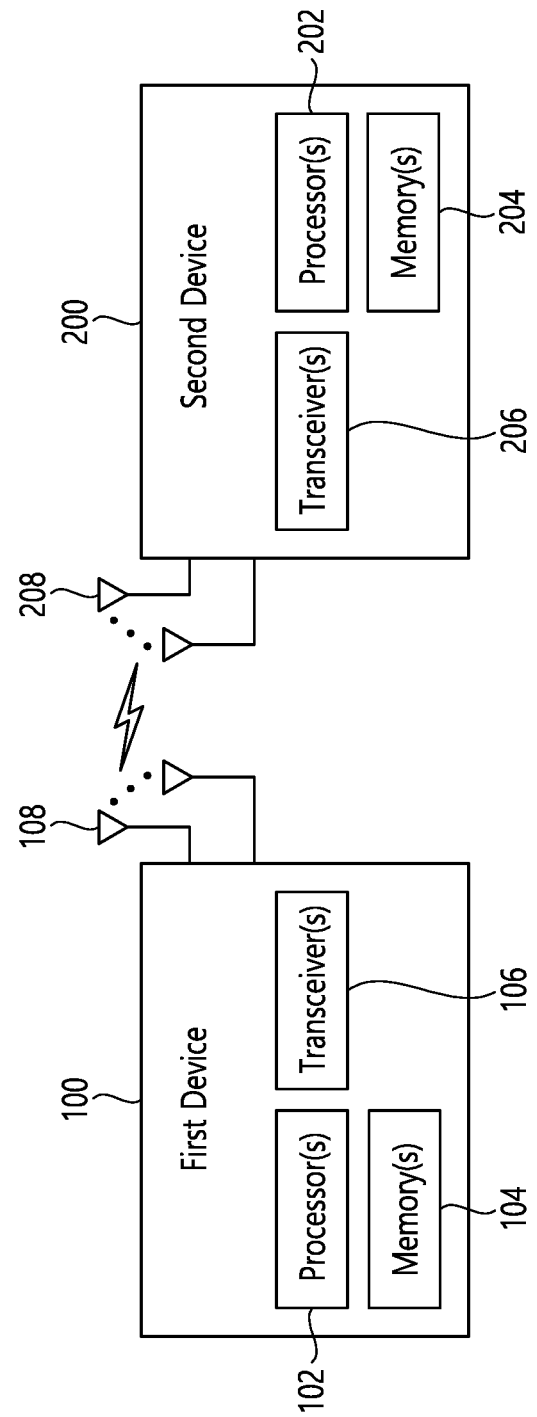
FIG. 23 shows wireless devices, in accordance with an embodiment of the present disclosure.

FIG. 23 shows wireless devices, in accordance with an embodiment of the present disclosure.

Referring to FIG. 23, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 22.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 24:
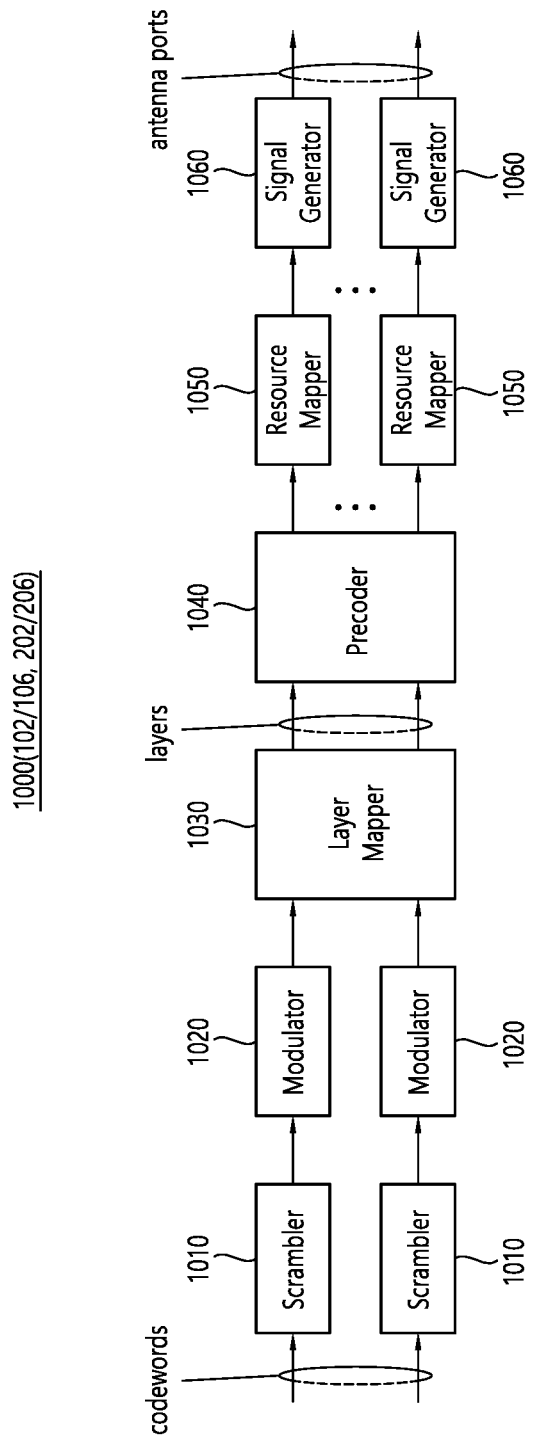
FIG. 24 shows a signal process circuit for a transmission signal, in accordance with an embodiment of the present disclosure.

FIG. 24 shows a signal process circuit for a transmission signal, in accordance with an embodiment of the present disclosure.

Referring to FIG. 24, a signal processing circuit (1000) may include scramblers (1010), modulators (1020), a layer mapper (1030), a precoder (1040), resource mappers (1050), and signal generators (1060). An operation/function of FIG. 24 may be performed, without being limited to, the processors (102, 202) and/or the transceivers (106, 206) of FIG. 23. Hardware elements of FIG. 24 may be implemented by the processors (102, 202) and/or the transceivers (106, 206) of FIG. 23. For example, blocks 1010~1060 may be implemented by the processors (102, 202) of FIG. 23. Alternatively, the blocks 1010~1050 may be implemented by the processors (102, 202) of FIG. 23 and the block 1060 may be implemented by the transceivers (106, 206) of FIG. 23.

Codewords may be converted into radio signals via the signal processing circuit (1000) of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 24. For example, the wireless devices (e.g., 100, 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
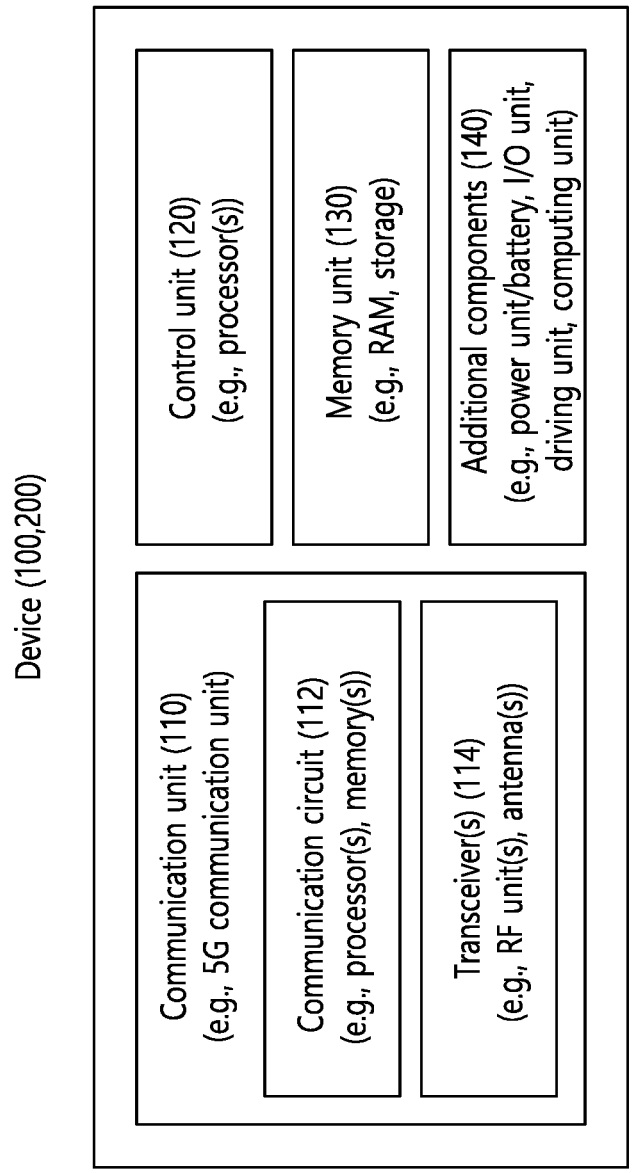
FIG. 25 shows another example of a wireless device, in accordance with an embodiment of the present disclosure.

FIG. 25 shows another example of a wireless device, in accordance with an embodiment of the present disclosure. The wireless device may be implemented in various forms according to a use-case/service (refer to FIG. 22).

Referring to FIG. 25, wireless devices (100, 200) may correspond to the wireless devices (100, 200) of FIG. 23 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 23. For example, the transceiver(s) (114) may include the one or more transceivers (106, 206) and/or the one or more antennas (108, 208) of FIG. 23. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 22), the vehicles (100b-1, 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, and so on. The wireless device may be used in a mobile or fixed place according to a use-example/service.

In FIG. 25, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
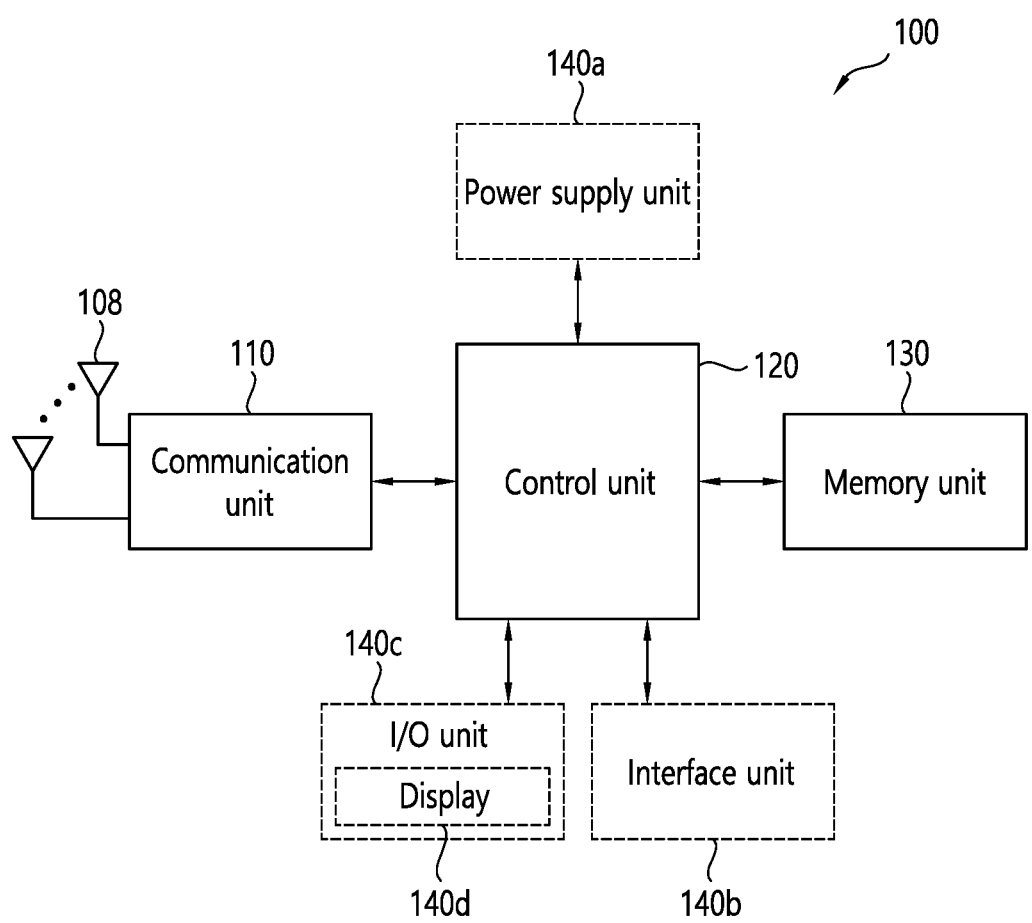
FIG. 26 shows a hand-held device, in accordance with an embodiment of the present disclosure.

FIG. 26 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110~130/140*a*~140*c* correspond to the blocks 110~130/140 of FIG. 25, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140*a*) may supply power to the hand-held device (100) and include a wired/wireless charging circuit, a battery, and so on. The interface unit (140*b*) may support connection of the hand-held device (100) to other external devices. The interface unit (140*b*) may include various ports (e.g., an audio I/O port and a video I/O port) for connection with external devices. The I/O unit (140*c*) may input or output video information/signals, audio information/signals, data, and/or information input by a user. The I/O unit (140*c*) may include a camera, a microphone, a user input unit, a display unit (140*d*), a speaker, and/or a haptic module.

As an example, in the case of data communication, the I/O unit (140*c*) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140*c*).

Figure 27:
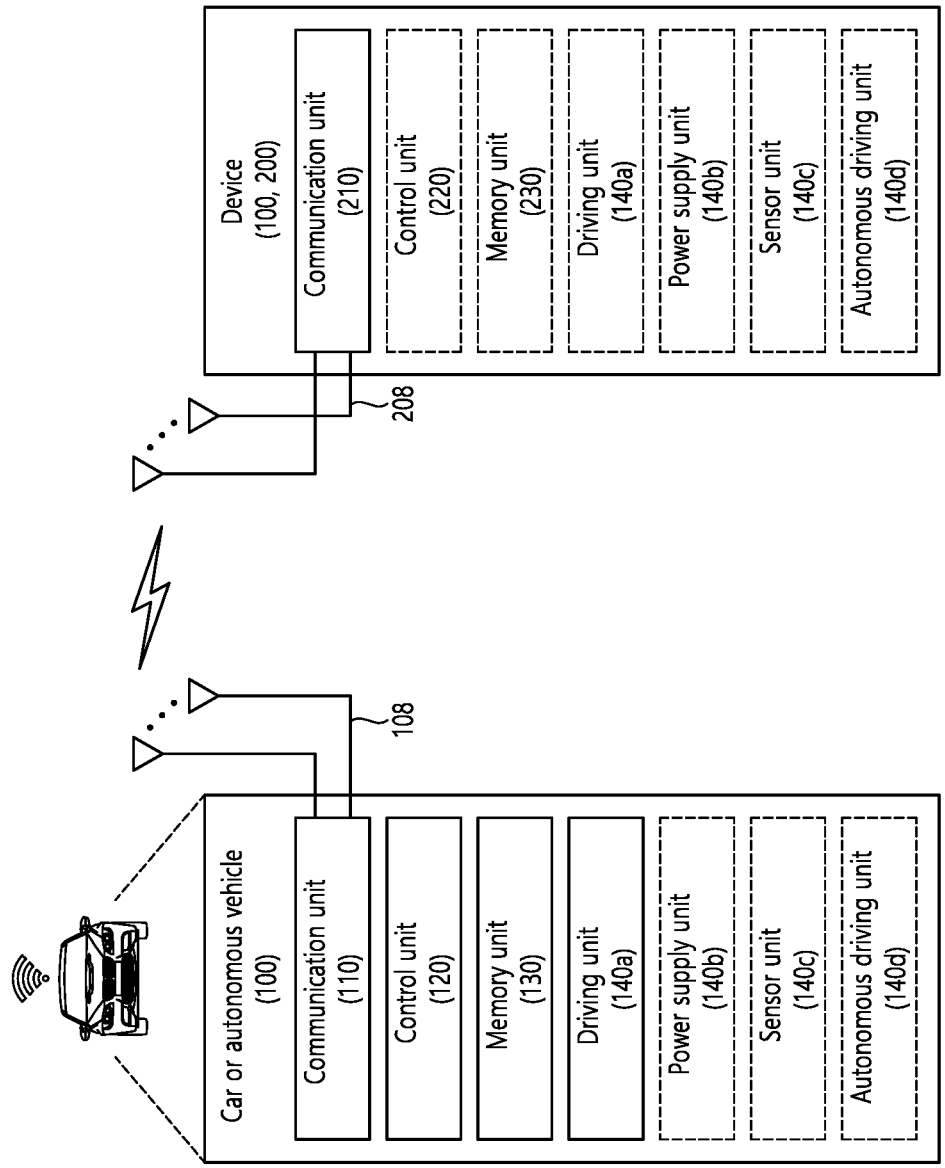
FIG. 27 shows a vehicle or an autonomous vehicle, in accordance with an embodiment of the present disclosure.

FIG. 27 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 27, a vehicle or autonomous vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*-140*d* correspond to the blocks 110/130/140 of FIG. 25, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140*a*) may cause the vehicle or the autonomous vehicle (100) to drive on a road. The driving unit (140*a*) may include an engine, a motor, a powertrain, a wheel, a brake, a steering device, and so on. The power supply unit (140*b*) may supply power to the vehicle or the autonomous vehicle (100) and include a wired/wireless charging circuit, a battery, and so on. The sensor unit (140*c*) may obtain a vehicle state, ambient environment information, user information, and so on. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 28:
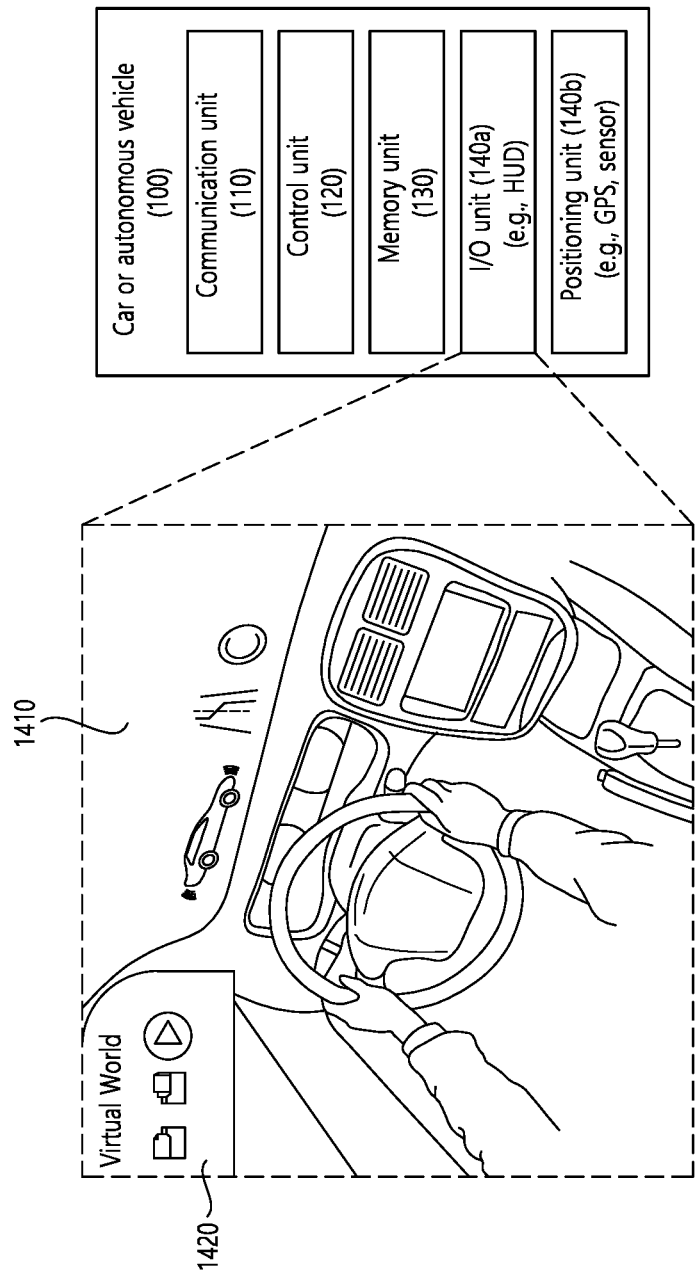

FIG. 28 shows a vehicle, in accordance with an embodiment of the present disclosure. The vehicle may be implemented as a transport means, an aerial vehicle, a ship, and so on.

Referring to FIG. 28, a vehicle (100) may include a communication unit (110), a control unit (120), a memory unit (130), an I/O unit (140*a*), and a positioning unit (140*b*). Herein, the blocks 110~130/140*a*~140*b* correspond to blocks 110~130/140 of FIG. 25.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include an HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100)

from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 29:
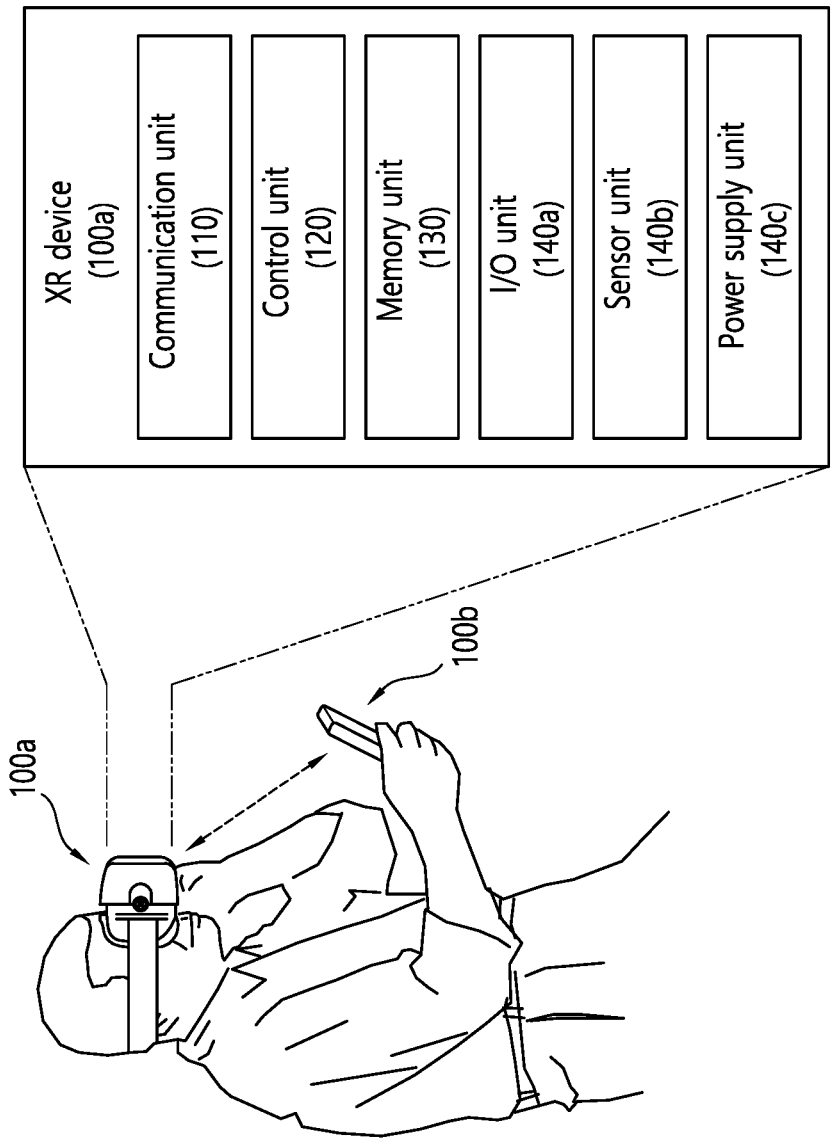
FIG. 29 shows an XR device, in accordance with an embodiment of the present disclosure.

FIG. 29 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 29, an XR device (100a) may include a communication unit (110), a control unit (120), a memory unit (130), an I/O unit (140a), a sensor unit (140b), and a power supply unit (140c). Herein, the blocks 110-130/140a-140c correspond to the blocks 110~130/140 of FIG. 25, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 30:
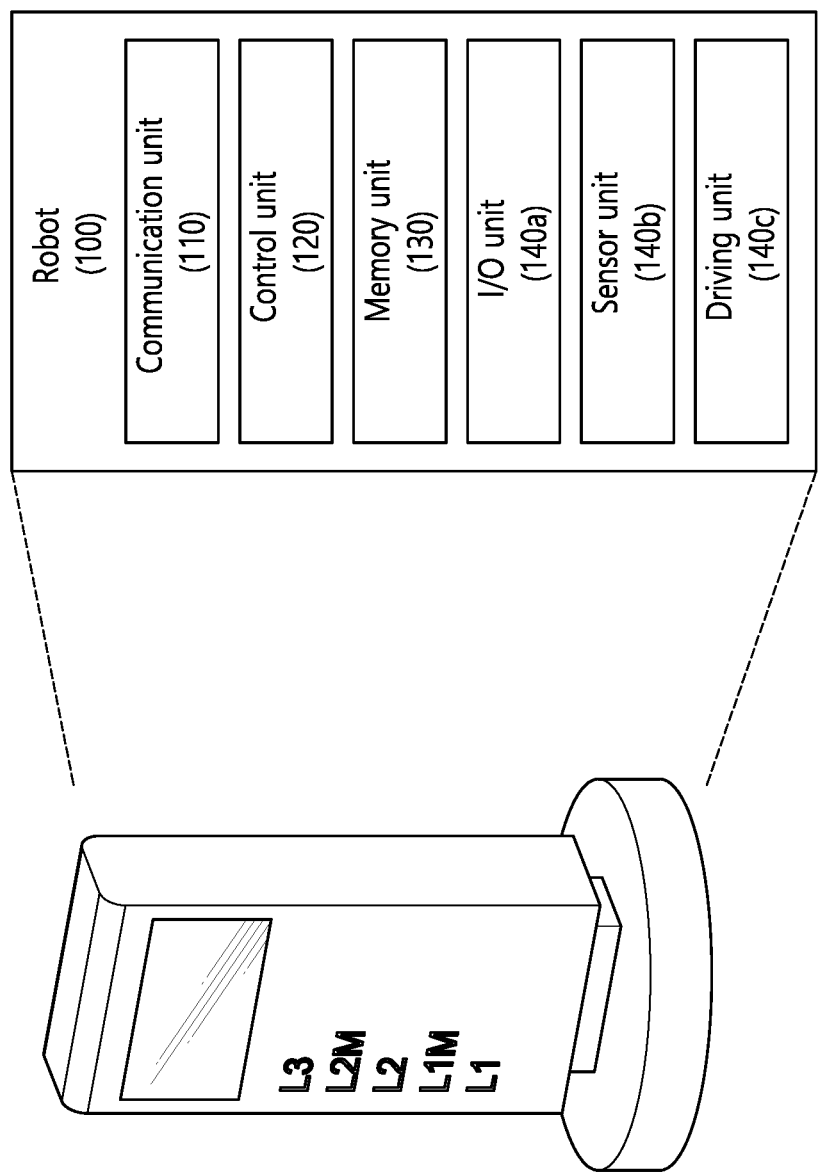
FIG. 30 shows a robot, in accordance with an embodiment of the present disclosure.

FIG. 30 shows a robot, in accordance with an embodiment of the present disclosure. The robot may be categorized into an industrial robot, a medical robot, a household robot, a military robot, and so on, according to a used purpose or field.

Referring to FIG. 30, a robot (100) may include a communication unit (110), a control unit (120), a memory unit (130), an I/O unit (140a), a sensor unit (140b), and a driving unit (140c). Herein, the blocks 110-130/140a-140c correspond to the blocks 110~130/140 of FIG. 25, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 31:
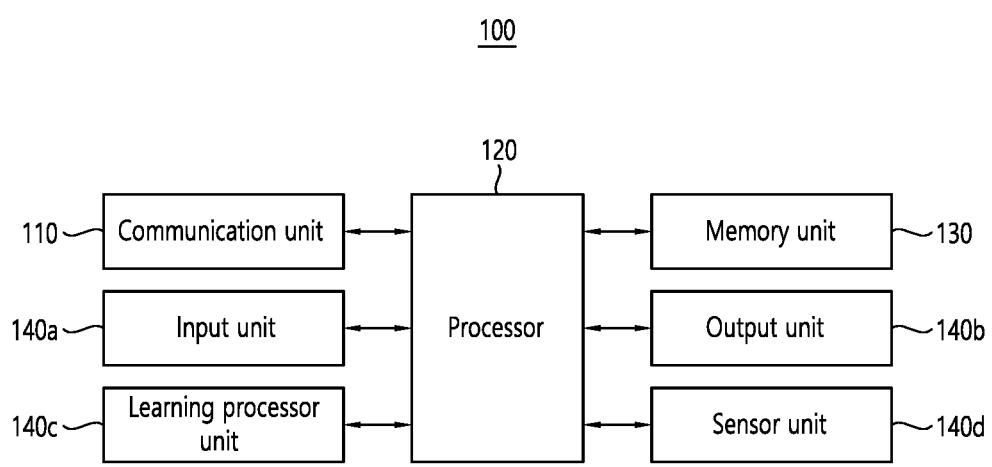
FIG. 31 shows an AI device, in accordance with an embodiment of the present disclosure.

FIG. 31 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 31, an AI device (100) may include a communication unit (110), a control unit (120), a memory unit (130), an I/O unit (140a/140b), a learning processor unit (140c), and a sensor unit (140d). The blocks 110-130/140a-140d correspond to blocks 110~130/140 of FIG. 25, respectively.

The communication unit (110) may transmit and receive wired/radio signals (e.g., sensor information, user input, learning models, or control signals) to and from external devices such as other AI devices (e.g., 100x, 200, 400 of FIG. 22) or an AI server (e.g., 400 of FIG. 22) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 22). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 22). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

Claims in the present description may be combined in various ways. For example, technical features in method claims of this specification may be combined to be implemented or performed in an apparatus, and technical features in apparatus claims may be combined to be implemented or performed in a method. Additionally, technical features in the method claim(s) and the apparatus claim(s) may be combined to be implemented or performed in an apparatus. Furthermore, technical features in method claim(s) and apparatus claim(s) may be combined to be implemented or performed in a method.

What is claimed is:

1. A method for performing wireless communication by a first apparatus, the method comprising:
    obtaining information related to a first bandwidth part (BWP) for communication between a base station and the first apparatus;
    obtaining information related to a second BWP for sidelink (SL) communication;
    obtaining information related to a time period for determining whether to perform a BWP switching from the first BWP to the second BWP;
    performing the BWP switching from the first BWP to the second BWP, based on that (i) a time period related to communication on the first BWP overlaps the time period for determining whether to perform the BWP switching from the first BWP to the second BWP and (ii) a priority related to SL transmission on the second BWP is higher than a priority threshold; and
    performing the SL transmission on the second BWP, after performing the BWP switching from the first BWP to the second BWP,
    wherein numerology related with the first BWP is different from numerology related with the second BWP.

2. The method of claim 1,
    wherein the information related to the time period for determining whether to perform the BWP switching from the first BWP to the second BWP includes a time period for performing the SL transmission on the second BWP and twice a time period for performing the BWP switching.

3. The method of claim 1, wherein the first BWP is switched to the second BWP, based on that (i) the time period related to the communication on the first BWP overlaps the time period for determining whether to perform the BWP switching from the first BWP to the second BWP and (ii) a service type related to the SL transmission on the second BWP takes precedence over a service type related to the communication on the first BWP.

4. The method of claim 1, wherein the first BWP is switched to the second BWP, based on that (i) the time period related to the communication on the first BWP overlaps the time period for determining whether to perform the BWP switching from the first BWP to the second BWP and (ii) information for channel or signaling related to the SL transmission on the second BWP takes precedence over the communication on the first BWP,
    wherein the information for channel or signaling includes at least one of information for a channel related to synchronization, information for a channel related to system information, information for signaling related to synchronization or information for signaling related to system information.

5. The method of claim 1, further comprising:
determining whether a latency requirement of a packet of which the SL transmission is stopped on the first second BWP is satisfied.

6. The method of claim 5, further comprising:
transmitting the packet of which the SL transmission is stopped on the second BWP by using a reserved resource, based on satisfying the latency requirement of the packet of which the SL transmission is stopped on the second BWP.

7. The method of claim 6, further comprising:
transmitting information related to the BWP switching to neighboring UEs,
wherein the information related to the BWP switching includes at least one of information related to the first BWP, time information required for the BWP switching, information on whether the BWP switching is required, or time information for performing the SL transmission on the second BWP after performing the BWP switching.

8. The method of claim 1, further comprising:
obtaining information related to the BWP switching from a network, and
wherein the information related to the BWP switching includes at least one of a location and a period of time resource of each BWP, a location and a period of frequency resource of each BWP, a center frequency of each BWP, a BWP switching time between a SL BWP and a Uu BWP, whether there is a potential need for BWP switching, numerology for each BWP, or information related to the SL transmission.

9. A first apparatus adapted to perform wireless communication on a bandwidth part (BWP), the first apparatus comprising:
at least one transceiver;
at least one processor; and
at least one memory connected to the at least one processor and storing instructions that, based on being executed, cause the at least one processor to perform operations comprising:
obtaining information related to a first bandwidth part (BWP) for communication between a base station and the first apparatus;
obtaining information related to a second BWP for sidelink (SL) communication;
obtaining information related to a time period for determining whether to perform a BWP switching from the first BWP to the second BWP;
performing the BWP switching from the first BWP to the second BWP, based on that (i) a time period related to communication on the first BWP overlaps the time period for determining whether to perform the BWP switching from the first BWP to the second BWP and (ii) a priority related to SL transmission on the second BWP is higher than a priority threshold; and
performing the SL transmission on the second BWP, after performing the BWP switching from the first BWP to the second BWP,
wherein numerology related with the first BWP is different from numerology related with the second BWP.

10. A processing device adapted to control a first apparatus to perform wireless communication on a bandwidth part (BWP), the processing device comprising:
at least one processor; and
at least one memory connected to the at least one processor and storing instructions that, based on being executed, cause the at least one processor to perform operations comprising:
obtaining information related to a first bandwidth part (BWP) for communication between a base station and the first apparatus;
obtaining information related to a second BWP for sidelink (SL) communication;
obtaining information related to a time period for determining whether to perform a BWP switching from the first BWP to the second BWP;
performing the BWP switching from the first BWP to the second BWP, based on that (i) a time period related to communication on the first BWP overlaps the time period for determining whether to perform the BWP switching from the first BWP to the second BWP and (ii) a priority related to SL transmission on the second BWP is higher than a priority threshold; and
performing the SL transmission on the second BWP, after performing the BWP switching from the first BWP to the second BWP,
wherein numerology related with the first BWP is different from numerology related with the second BWP.

* * * * *